(12) United States Patent
Terashima

(10) Patent No.: US 8,610,784 B2
(45) Date of Patent: Dec. 17, 2013

(54) IMAGING APPARATUS, IMAGING SYSTEM, CONTROL METHOD OF IMAGING APPARATUS, AND PROGRAM

(75) Inventor: Yoshito Terashima, Tokyo (JP)

(73) Assignee: Sony Corporation, Tokyo (JP)

( * ) Notice: Subject to any disclaimer, the term of this patent is extended or adjusted under 35 U.S.C. 154(b) by 132 days.

(21) Appl. No.: 13/076,975

(22) Filed: Mar. 31, 2011

(65) Prior Publication Data

US 2011/0292276 A1 Dec. 1, 2011

(30) Foreign Application Priority Data

May 28, 2010 (JP) ................................ 2010-122168

(51) Int. Cl.
*H04N 5/228* (2006.01)
*H04N 5/232* (2006.01)

(52) U.S. Cl.
USPC ...................... 348/208.12; 348/345

(58) Field of Classification Search
USPC .......... 348/207.99, 208.12, 345, 346; 396/80, 396/79, 93, 102, 121, 139
See application file for complete search history.

(56) References Cited

U.S. PATENT DOCUMENTS 5,353,089 A * 10/1994 Yaji ................................ 348/353
2009/0147378 A1* 6/2009 Zalevsky et al. ............... 359/738
2009/0262230 A1* 10/2009 Sugiura .................... 348/333.11

FOREIGN PATENT DOCUMENTS

JP 2003-107332 4/2003

OTHER PUBLICATIONS

U.S. Appl. No. 13/078,414, filed Apr. 1, 2011, Terashima, et al.

* cited by examiner

*Primary Examiner* — Lin Ye
*Assistant Examiner* — Euel Cowan
(74) *Attorney, Agent, or Firm* — Oblon, Spivak, McClelland, Maier & Neustadt, L.L.P.

(57) ABSTRACT

An imaging apparatus is provided which includes an imaging section which converts incident light which is incident from a subject via a lens and generates an imaging image; a selection section which, in regard to each of a plurality of ranging areas arranged in the generated imaging image, obtains a subject distance which is a distance from the lens to a subject included in the ranging area and an MTF for each of the ranging areas in relation to the lens, and selects a ranging area which includes a subject to be a focusing target as a focusing target area based on the obtained subject distance and MTF; and a focus control section which performs focus control so as to focus on a subject included in the selected focusing target area.

11 Claims, 13 Drawing Sheets

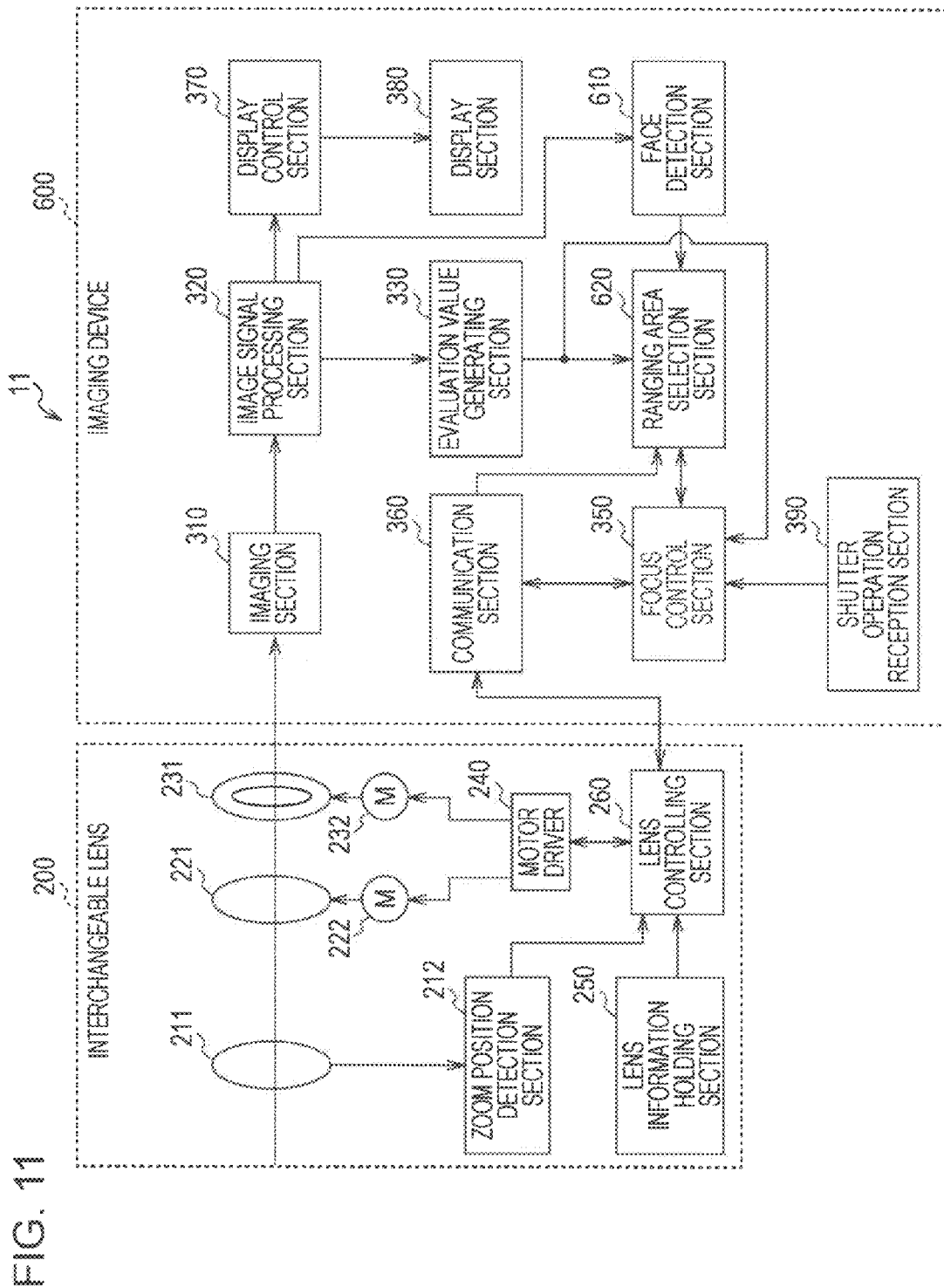

IMAGING APPARATUS, IMAGING SYSTEM, CONTROL METHOD OF IMAGING APPARATUS, AND PROGRAM

BACKGROUND OF THE INVENTION

1. Field of the Invention

The present invention relates to an imaging apparatus, and in particular, to an imaging apparatus and an imaging system provided with an autofocus function, a control method of the same, and a program which executes the method on a computer.

2. Description of the Related Art

In recent years, imaging apparatuses, such as digital still cameras or digital video cameras (for example, a recorder integrated with a camera) which image a subject such as a person or an animal, generate image data (imaging images), and record the image data as image content, have become widespread. In addition, imaging apparatuses provided with an autofocus function where the focus is automatically adjusted are widespread.

As an imaging apparatus provided with an autofocus function, for example, there is an imaging apparatus which arranges a plurality of ranging areas in the generated imaging image and selects an optimal ranging area out of each of the ranging areas. The function which selects an optimal ranging area in this manner (ranging area selection function) is referred to as, for example, "multi AF", "multipoint ranging AF", and "wide AF".

By performing an imaging operation using the imaging apparatus which is provided with the ranging area selection function, it is possible to adjust the focus to a main subject even in a case where, for example, the main subject is not in the center of the imaging image. That is, since it is possible to adjust the focus to the main subject without any particular operation by a photographer, it is possible for even a beginner to record a suitable imaging image.

Here, in a case where an imaging image is generated using an imaging apparatus, the degree of MTF degradation with regard to a change in image height is different due to individual differences in lenses used in the generation. That is, MTF characteristics are different due to individual differences in lenses used in the generation of the imaging images. As a result, for example, in a case where the imaging image is generated using an imaging apparatus which is able to be mounted with an interchangeable lens, it is important to select the ranging area in consideration of the MTF characteristics of the mounted interchangeable lens.

For example, a camera is proposed which corrects differences in a focus evaluation value due to differences in MTF using a small weighting for ranging areas with a high MTF and a large weighting for ranging areas with a low MTF with regard to the focus evaluation values of the plurality of ranging areas (for example, Japanese Unexamined Patent Application Publication No. 2003-107332 (FIG. 1)).

SUMMARY OF THE INVENTION

In the techniques in the related art described above, in a case where the focus evaluation value of a plurality of ranging areas is compared, it is possible to remove the effect of MTF characteristics by correcting the BPF characteristics. According to this, in the techniques in the related art described above, it becomes easier to select a ranging area with a low MTF. As a result, it is possible to select a comparatively more appropriate ranging area in a case where the rate of decrease of MTF is comparatively small.

However, in the techniques in the related art described above, even in a case where the rate of decrease of MTF is comparatively large, since it is easier for a ranging area with a low MTF to be selected, there is concern that a ranging area with an extremely low MTF will be selected. In this manner, in the case where a ranging area with an extremely low MTF is selected, there is concern that it may not be possible to record an imaging image with a sense of resolution.

It is desirable that an appropriate ranging area is set in consideration of MTF characteristics.

An imaging apparatus, a control method of the same and a program which executes the method on a computer according to a first embodiment of the invention are provided with an imaging section which converts incident light which is incident from a subject via a lens and generates an imaging image; a selection section which, in regard to each of a plurality of ranging areas arranged in the generated imaging image, obtains a subject distance which is the distance from the lens to a subject included in the ranging area and an MTF for each of the ranging areas in relation to the lens, and selects a ranging area which includes a subject to be a focusing target as a focusing target area based on the obtained subject distance and MTF; and a focus control section which performs focus control so as to focus on a subject included in the selected focusing target area. According to this, an effect is provided where, in regard to each of the plurality of ranging areas, the subject distance and the MTF are obtained, the focusing target area is selected based on the obtained subject distance and MTF, and the focus control is performed so as to focus on the subject included in the selected focusing target area.

In addition, it is desirable that, in a case where a ranging area which includes a subject where the subject distance is the shortest and a ranging area where the MTF is the highest are the same, the selection section selects the ranging area as the focusing target area. According to this, an effect is provided where, in the case where the ranging area which includes the subject where the subject distance is the shortest and the ranging area where the MTF is the highest are the same, the ranging area is selected as the focusing target area.

In addition, it is desirable that, in a case where it is determined whether or not the ranging area which includes the subject where the subject distance is the shortest and the ranging area where the MTF is the highest are the same and the ranging areas are not the same, in a case where the MTF of the ranging area which includes the subject where the subject distance is the shortest is small on the basis of a threshold value, the selection section removes the ranging area from the selection target of the focusing target area and performs the determination with regard to each of the ranging areas which are selection targets of the focusing target area after the removal. According to this, an effect is provided where, in the case where it is determined whether or not the ranging area which includes the subject where the subject distance is the shortest and the ranging area where the MTF is the highest are the same and the ranging areas are not the same, in a case where the MTF of the ranging area which includes the subject where the subject distance is the shortest is small on the basis of a threshold value, the ranging area is removed from the selection target of the focusing target area and the determination is performed with regard to each of the ranging areas which are selection targets of the focusing target area after the removal.

In addition, it is desirable that, in the case where the ranging area which includes the subject where the subject distance is the shortest and the ranging area where the MTF is the highest are not the same, in a case where a rate of decrease of the MTF of the ranging area which includes the subject where the subject distance is the shortest with regard to the ranging area where the MTF is the highest is small on the basis of a threshold value, the selection section selects the ranging area which includes the subject where the subject distance is the shortest as the focusing target area. According to this, an effect is provided where, in the case where the ranging area which includes the subject where the subject distance is the shortest and the ranging area where the MTF is the highest are not the same, in a case where the rate of decrease of the MTF of the ranging area which includes the subject where the subject distance is the shortest with regard to the ranging area where the MTF is the highest is small on the basis of a threshold value, the ranging area which includes the subject where the subject distance is the shortest is selected as the focusing target area.

In addition, it is desirable that, in the case where the ranging area which includes the subject where the subject distance is the shortest and the ranging area where the MTF is the highest are not the same and the MTF of the ranging area which includes the subject where the subject distance is the shortest is large on the basis of a threshold value, in the case where the rate of decrease of the MTF of the ranging area which includes the subject where the subject distance is the shortest with regard to the ranging area where the MTF is the highest is small on the basis of a threshold value, the selection section selects the ranging area which includes the subject where the subject distance is the shortest as the focusing target area. According to this, an effect is provided where, in the case where the ranging area which includes the subject where the subject distance is the shortest and the ranging area where the MTF is the highest are not the same and the MTF of the ranging area which includes the subject where the subject distance is the shortest is large on the basis of a threshold value, in the case where the rate of decrease of the MTF of the ranging area which includes the subject where the subject distance is the shortest with regard to the ranging area where the MTF is the highest is small on the basis of a threshold value, the ranging area which includes the subject where the subject distance is the shortest is selected as the focusing target area.

In addition, it is desirable that, in the case where the ranging area which includes the subject where the subject distance is the shortest and the ranging area where the MTF is the highest are not the same and the MTF of the ranging area which includes the subject where the subject distance is the shortest is large on the basis of a threshold value, in a case where the rate of decrease of the MTF of the ranging area which includes the subject where the subject distance is the shortest with regard to the ranging area where the MTF is the highest is large on the basis of a threshold value, the selection section removes the ranging area which includes the subject where the subject distance is the shortest from the selection target of the focusing target area. According to this, an effect is provided where, in the case where the ranging area which includes the subject where the subject distance is the shortest and the ranging area where the MTF is the highest are not the same and the MTF of the ranging area which includes the subject where the subject distance is the shortest is large on the basis of a threshold value, in the case where the rate of decrease of the MTF of the ranging area which includes the subject where the subject distance is the shortest with regard to the ranging area where the MTF is the highest is large on the basis of a threshold value, the ranging area which includes the subject where the subject distance is the shortest is removed from the selection target of the focusing target area.

In addition, it is desirable that, in the case where the ranging area which includes the subject where the subject distance is the shortest and the ranging area where the MTF is the highest are not the same and the rate of decrease of the MTF of the ranging area which includes the subject where the subject distance is the shortest with regard to the ranging area where the MTF is the highest is large on the basis of a threshold value, in a case where difference values in the subject distances in relation to the subjects included in each of the ranging areas are small on the basis of a threshold value, the selection section selects the ranging area where the MTF is the highest as the focusing target area. According to this, an effect is provided where, in the case where the ranging area which includes the subject where the subject distance is the shortest and the ranging area where the MTF is the highest are not the same and the rate of decrease of the MTF of the ranging area which includes the subject where the subject distance is the shortest with regard to the ranging area where the MTF is the highest is large on the basis of a threshold value, in the case where the difference values of the subject distances in relation to the subjects included in each of the ranging areas are small on the basis of a threshold value, the ranging area where the MTF is the highest is selected as the focusing target area.

In addition, it is desirable that, in the case where the ranging area which includes the subject where the subject distance is the shortest and the ranging area where the MTF is the highest are not the same and the rate of decrease of the MTF of the ranging area which includes the subject where the subject distance is the shortest with regard to the ranging area where the MTF is the highest is large on the basis of a threshold value, in a case where difference values in the subject distances in relation to the subjects included in each of the ranging areas are large on the basis of a threshold value, the selection section removes the ranging area where the MTF is the highest from the selection target of the focusing target area. According to this, an effect is provided where, in the case where the ranging area which includes the subject where the subject distance is the shortest and the ranging area where the MTF is the highest are not the same and the rate of decrease of the MTF of the ranging area which includes the subject where the subject distance is the shortest with regard to the ranging area where the MTF is the highest is large on the basis of a threshold value, in a case where difference values in the subject distances in relation to the subjects included in each of the ranging areas are large on the basis of a threshold value, the ranging area where the MTF is the highest is removed from the selection target of the focusing target area.

In addition, it is desirable that a detection section, which detects a specific target object which is included in the generated imaging image, is further provided, and the selection section arranges the ranging areas on the basis of a position of the detected specific target object in the generated imaging image. According to this, an effect is provided where the specific target object which is included in the generated imaging image is detected and the ranging areas are arranged on the basis of a position of the specific target object in the generated imaging image.

An imaging system, a control method of the same and a program which executes the method on a computer according to a second embodiment of the invention are provided with an interchangeable lens which is provided with a plurality of optical members which includes a lens, a first communication section which performs communication with the imaging apparatus, and a holding section which holds MTF according to each of the states of the plurality of optical members for each of the states of the plurality of optical members; and a second communication section which performs communication with the interchangeable lens, an imaging section which converts incident light from a subject which is incident via the lens and generates an imaging image, a selection section which, in regard to each of a plurality of ranging areas arranged in the generated imaging image, obtains an MTF for each of the ranging areas in relation to the lens from the holding section, calculates a subject distance which is the distance from the lens to a subject included in the ranging area for each of the ranging areas, and selects a ranging area which includes a subject to be a focusing target as a focusing target area based on the calculated subject distance and the obtained MTF, and a focus control section which performs focus control so as to focus on a subject included in the selected focusing target area. According to this, an effect is provided where, in regard to each of the plurality of ranging areas, the subject distance and the MTF are obtained, the focusing target area is selected based on the obtained subject distance and MTF, and the focus control is performed so as to focus on the subject included in the selected focusing target area.

According to the invention, a superior effect is able to be obtained where it is possible for an appropriate ranging area to be set in consideration of MTF characteristics.

BRIEF DESCRIPTION OF THE DRAWINGS

FIG. 11 is a block diagram illustrating a functional configuration example of an imaging apparatus according to a second embodiment of the invention;

DESCRIPTION OF THE PREFERRED EMBODIMENTS

Below, the embodiments for realizing the invention (referred to below as embodiments of the invention) will be described. The description will be performed in the order below.

1. First Embodiment (ranging area selection control: an example where one ranging area is selected from a plurality of ranging areas based on MTF characteristics and a subject distance in an imaging system)

2. Second Embodiment (ranging area selection control: an example where one ranging area is selected from ranging areas where there is a face of a person included in an imaging image)

3. Third Embodiment (ranging area selection control: an example where one ranging area is selected from a plurality of ranging areas based on MTF characteristics and a subject distance in an imaging apparatus)

1. First Embodiment

Internal Configuration Example of Imaging System

Figure 1:
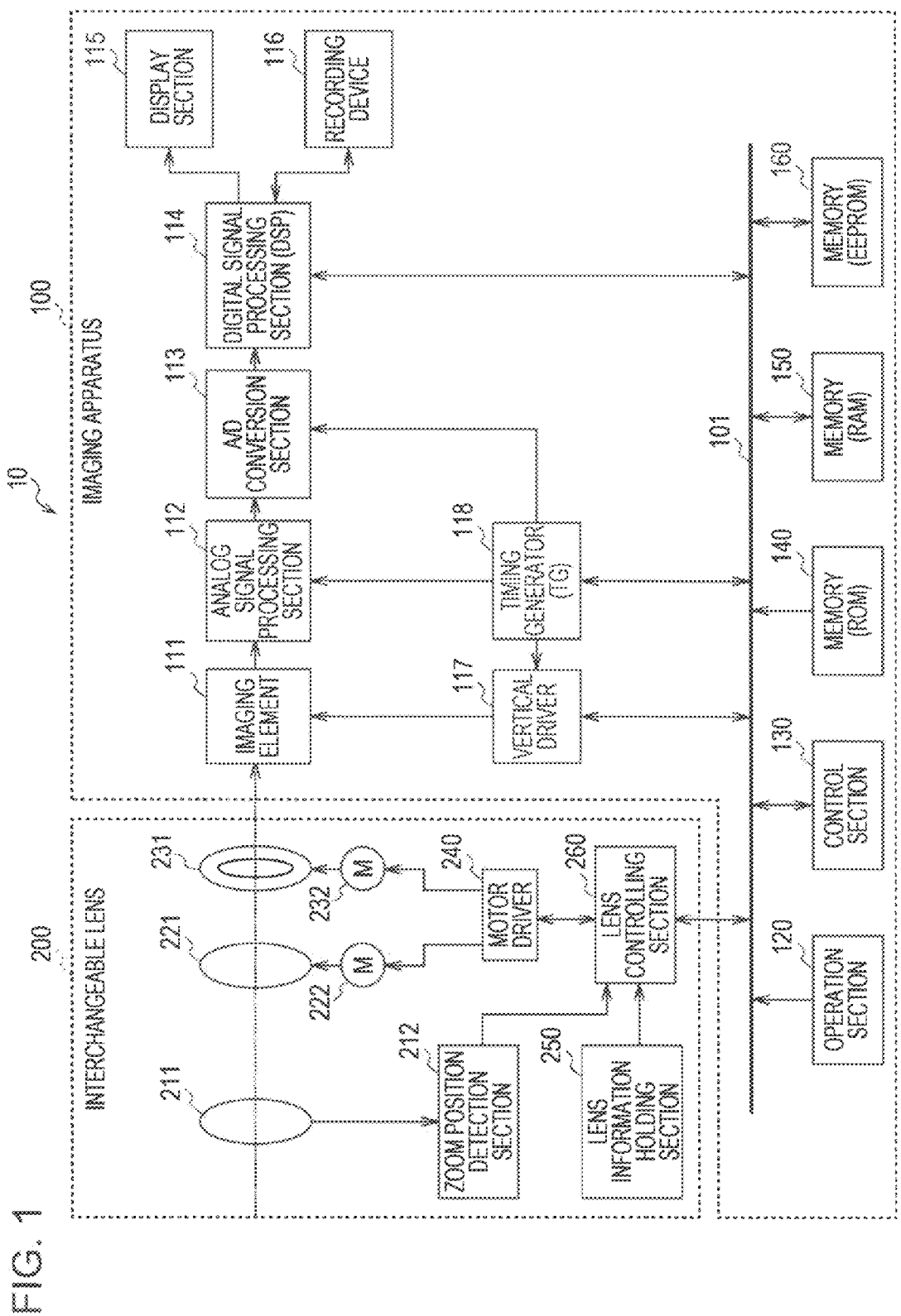
FIG. 1 is a block diagram illustrating an internal configuration example of an imaging system according to a first embodiment of the invention.

FIG. 1 is a block diagram illustrating an internal configuration example of an imaging system 10 according to a first embodiment of the invention. The imaging system 10 is provided with an imaging apparatus 100 and an interchangeable lens 200. It is possible to realize the imaging system 10 using, for example, a digital still camera where the lens is able to be interchanged (for example, a digital single-lens camera).

The imaging apparatus 100 is an imaging apparatus which images a subject, generates image data (imaging images), and records the generated image data as image content (still image content or moving image content). In addition, it is possible for the interchangeable lens 200 to be attached to the imaging image 100 via a lens mount (not shown).

The interchangeable lens 200 is an interchangeable lens unit which is attached to the imaging apparatus 100 via the lens mount (not shown). The interchangeable lens 200 is provided with a zoom lens 211, a zoom position detection section 212, a focus lens 221, a focus lens driving motor 222, an aperture 231, and an aperture driving motor 232. In addition, the interchangeable lens 200 is provided with a motor driver 240, a lens information holding section 250, and a lens control section 260.

The zoom lens 211 is a lens which is moved in an optical axis direction by driving which is either automatic or manual and the focus distance is adjusted. That is, the zoom lens 211 is a lens which drives forward and backward with regard to a subject to enlarge or reduce a subject included in an imaging image. In addition, a zoom function is realized using the zoom lens 211. Here, in the first embodiment of the invention, an example is shown where the zoom lens 211 is driven using a manual operation by a user.

The zoom position detection section 212 detects the position of the zoom lens 211 which is driven due to a zoom operation by a user, and outputs the detection result to the lens control section 260.

The focus lens 221 is a lens which is moved in an optical axis direction is moved by driving of the focus lens driving motor 222 and the focus distance is adjusted. That is, the focus lens 221 is a lens which is used for focusing on a desired target object included in a subject. In addition, an autofocus function is realized using the focus lens 221.

The focus lens driving motor 222 moves the focus lens 221 based on control of the motor driver 240.

The aperture 231 adjusts the amount of light of the incident light which passes through the zoom lens 211 and the focus lens 221, and supplies the light after adjustment to an imaging element 111. The aperture 231 is driven by the aperture driving motor 232 and the opening of the aperture is adjusted.

The aperture driving motor 232 drives the aperture 231 based on control of the motor driver 240.

The zoom lens 211 and the focus lens 221 which configure the interchangeable lens 200 in this manner are a group of lenses which condense the incident light from the subject, and the light condensed using the groups of lenses is incident on the imaging element 111 via the aperture 231.

The motor driver 240 is a driver which drives the focus lens driving motor 222 and the aperture driving motor 232 based on control of the lens control section 260.

The lens information holding section 250 is a memory which holds unique information (lens information) relating to each of the optical members (the focus lens 221, the aperture 231, and the like) which configure the interchangeable lens 200, and supplies the held information to the lens control section 260. The unique information is optical member information (lens information) relating to the optical members including, for example, the position of a focus lens 221 (position of the subject which matches the focus), the focus distance, the aperture value (F value), and the MTF. Here, the MTF (Modulation Transfer Function) is one indicator which shows lens performance and shows the reproducibility of contrast for each image height (distance from the center of the picture plane). In addition, the MTF changes in accordance with a focus distance f, the aperture value, the position of the focus lens 221, and the like. In addition, when the type of lens is different, the MTF characteristics also often change significantly. As a result, the MTF according to the state of each optical member (the position of the focus lens 221 and the like) are linked to each state and held in the lens information holding section 250 as unique information. That is, the lens information holding section 250 holds the MTF according to each state of the plurality of optical members for each state of the plurality of optical members. In addition, the lens information holding section 250 is an example of a holding section which is described in the scope of the claims.

The lens control section 260 performs communication processing of each type of information with the imaging apparatus 100 and controls each section (the focus lens 221, the aperture 231, and the like) which configures the interchangeable lens 200 based on the communication result. That is, the lens control section 260 controls each section which configures the interchangeable lens 200 based on control signals from a control section 130 of the imaging apparatus 100. In addition, the lens control section 260 sends the lens information which is held in the lens information holding section 250 to the control section 130 according to a send request from the control section 130 of the imaging apparatus 100. For example, the communication processing between the imaging apparatus 100 and the interchangeable lens 200 is performed using synchronized communication. In addition, the lens control section 260 is an example of a first communication section which is described in the scope of the claims.

The imaging apparatus 100 is provided with a system bus 101, the imaging element 111, an analog signal processing section 112, and an A/D (analog/digital) conversion section 113. In addition, the imaging apparatus 100 is provided with a digital signal processing section (referred to below as a "DSP (Digital Signal Processor)") 114, a display section 115, and a recording device 116. In addition, the imaging apparatus 100 is provided with a vertical driver 117, a timing generator (refer to below as a "TG (Timing Generator)") 118, an operation section 120, and the control section 130. In addition, the imaging apparatus 100 is provided with a memory (ROM (Read Only Memory)) 140 and a memory (RAM (Random Access Memory)) 150. In addition, the imaging apparatus 100 is provided with a memory (EEPROM (Electrically Erasable and Programmable Read Only Memory)) 160. In addition, the DSP 114, the vertical driver 117, the TG 118, the operation section 120, the control section 130, the memory (ROM) 140, the memory (RAM) 150 and the memory (EEPROM) 160 are connected via the system bus 101 so as to be able to communicate with each other.

The imaging element 111 is a photoelectric conversion element which receives light (incident light) which is supplied via the zoom lens 211, the focus lens 221, and the aperture 231 and converts the incident light to electrical signals. Then, the imaging element 111 supplies the converted electrical signals (analog signals) to the analog signal processing section 112. In addition, the imaging element 111 is driven using the vertical driver 117. Here, as the imaging element 111, it is possible to use, for example, a CCD (Charge Coupled Device) sensor or a CMOS (Complementary Metal Oxide Semiconductor) sensor.

The analog signal processing section 112 is driven using the TG 118 and performs analog processing such as noise removal processing with regard to the electrical signals (analog signals) supplied from the imaging element 111 and the analog signals where analog processing has been performed are supplied to the A/D conversion section 113.

The A/D conversion section 113 is driven by the TG 118 and converts the analog signals supplied from the analog signal processing section 112 to digital signals and supplies the converted digital signals to the DSP 114.

The DSP 114 performs image processing such as black label correction, white balance adjustment, and γ correction in regard to the digital signals supplied from the A/D conversion section 113 based on control of the controls section 130. Then, the DSP 114 supplies the image data on which image processing has been performed to the display section 115, the recording device 116, and the control section 130. For example, the DSP 114 performs compression processing with regard to the image data on which image processing has been performed and supplies the image data on which compression processing has been performed (compressed image data) to the recording device 116. In addition, the DSP 114 performs uncompression processing with regard to the compressed image data recorded in the recording device 116 and supplies the image data on which uncompression processing has been performed to the display section 115. In addition, as the compression method, it is possible to adopt, for example, the JPEG (Joint Photographic Experts Group) method. In addition, the control section 130 performs each control using the image data supplied from the DSP 114.

The display section 115 is a display device which displays the image data supplied from the DSP 114. For example, in an imaging waiting state when set in a still image imaging mode, the display section 115 displays the image data on which image processing has been performed by the DSP 114 as an imaging image (a so-called through image). In addition, example, it is possible for the display section 115 to display the image data recorded in the recording device 116 as a catalog image and to reproduce the image data. As the display section 115, it is possible to use, for example, a display panel such as an organic EL (Electro Luminescence) panel or an LCD (Liquid Crystal Display).

The recording device 116 is a recording device which records image data on which image processing has been performed by the DSP 114. In addition, the recording device 116 supplies recorded image data to the DSP 114. In addition, the recording device 116 may be built into the imaging apparatus 100 or may be able to be attached and detached from the imaging apparatus 100. In addition, as the recording device 116, it is possible to use various recording media such as a semiconductor memory, an optical recording medium, a magnetic disk, and a HDD (Hard Disk Drive). Here, as an optical recording medium, it is possible to use, for example, a recordable DVD (Digital Versatile Disk), a recordable CD (Compact Disc), a Blu-ray Disc (registered trademark), and the like.

The vertical driver 117 is a vertical driver which drives the imaging element 111 based on control of the control section 130.

The TG 118 generates driving control signals of the vertical driver 117, the analog signal processing section 112, and the A/D conversion section 113 based on a standard clock supplied from the control section 130.

The operation section 120 is an operation section which is provided with an operation member, such as a button or a switch, for performing each type of operation, receives an operation input from a user, and outputs the content of the received operation input to the control section 130 via the system bus 101. In addition, other than the operation member such as the button arranged on the outer surface of the imaging apparatus 100, a touch panel may be provided on the display section 115 and the touch panel may receive the operation input from a user.

The control section 130 is a central processing device which controls each section of the imaging apparatus 100 based on each piece of information recorded in the memory (ROM) 140 and the like. In addition, the control section 130 performs communication control of the interchangeable lens 200 and performs sending and receiving of each type of information. The control section 130 controls, for example, exposure, white balance, focus, flash emission (a flash emission section 102 shown in FIGS. 2A to 2C), and the like. In addition, for example, the control section 130 generates control signals based on operation input of a user from the operation section 120 and image data from the DSP 114 during imaging. Then, the generated control signals are output to the motor driver 240, the vertical driver 117, the TG 118, the interchangeable lens 200, and the like, and controlling of exposure, white balance, focus, flash, and the like is performed by operating the focus lens 221, the aperture 231, and the like. In addition, the control section 130 performs a send request for information used in each processing to the interchangeable lens 200.

In addition, in a case where image data on which image processing has been performed by the DSP 114 is recorded, the control section 130 outputs control signals to the DSP 114 based on the operation input of a user from the operation section 120. Then, the image data on which compression processing has been performed by the DSP 114 is recorded in the recording device 116 as a still image file. In addition, in a case where a still image file which is recorded in the recording device 116 is displayed, the control section 130 outputs controls signals to the DSP 114 based on the operation input of a user from the operation section 120. Then, the image which corresponds to the still image file recorded in the recording device 116 is displayed on the display section 115.

In addition, the control section 130 performs focus control (so-called contrast AF) using contrast signals of the subject obtained from the image signals generated by the imaging element 111. In this case, a plurality of ranging areas are arranged in the generated image signals (imaging image) and one of the ranging areas out of each of the ranging areas is selected as a focus target area. According to this, it is possible to record an appropriate photograph (imaging image) where there is a focus on a main subject. Here, the control section 130 is realized by, for example, a CPU (Central Processing Unit). In addition, the functional configuration of the control section 130 will be described in detail with reference to FIG. 3.

The memory (ROM) 140 is a non-volatile memory which stores various types of programs and various types of data for the control section 130 to execute various processings.

The memory (RAM) 150 is a volatile memory which holds data to be temporarily held and rewritable data when the control section 130 is operating, and for example, uses a working memory when the control section 130 is operating.

The memory (EEPROM) 160 is a memory which holds data even when the power to the imaging apparatus 100 is turned off and records various types of setting conditions and the like.

External configuration Example of Imaging System

Figure 2A:
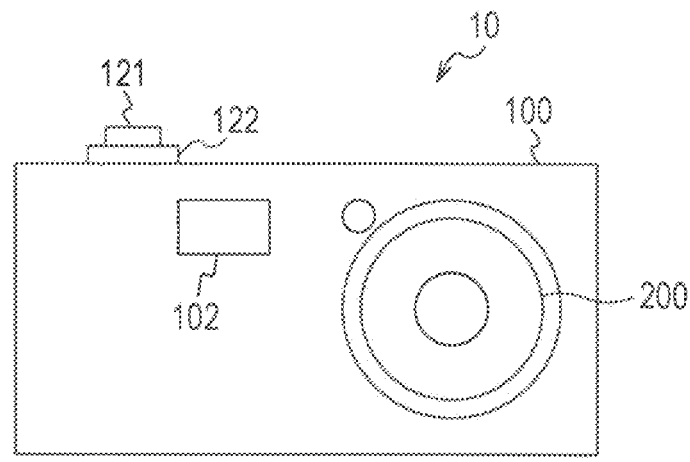
FIGS. 2A to 2C are diagrams illustrating an external configuration example of the imaging system according to the first embodiment of the invention.
Figure 2B:
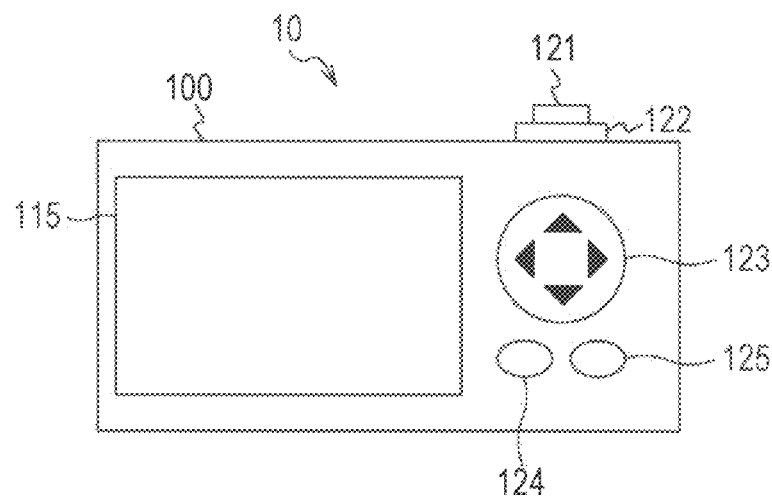
Figure 2C:
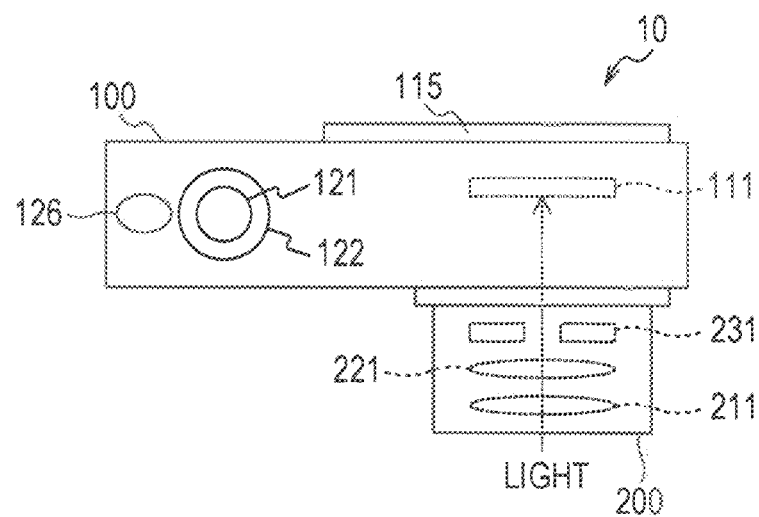

FIGS. 2A to 2C are diagrams illustrating an external configuration example of the imaging system 10 according to the first embodiment of the invention. FIG. 2A is a front surface diagram illustrating the outer appearance of the imaging system 10, FIG. 2B is a rear surface diagram illustrating the outer appearance of the imaging system 10, and FIG. 2C is an upper surface diagram illustrating the outer appearance of the imaging system 10.

The imaging apparatus 100 is provided with the flash emission section 102, the imaging element 111, the display section 115, a shutter button 121, a mode dial 122, an up/down and left/right operation button 123, an OK button 124, a cancel button 125, and a power switch 126. In addition, the interchangeable lens 200 is provided with the zoom lens 211, the focus lens 221, and the aperture 231. Here, the shutter button 121, the mode dial 122, the up/down and left/right operation button 123, the OK button 124, the cancel button 125, and the power switch 126 correspond to the operation section 120 shown in FIG. 1. In addition, since the imaging element 111, the display section 115, the zoom lens 211, the focus lens 221, and the aperture 231 correspond to the respective sections with the same name shown in FIG. 1, a detailed description will not be included here. Here, since the zoom lens 211, the focus lens 221, and the aperture 231 are built into the interchangeable lens 200 and the imaging element 111 is built into the imaging apparatus 100, these sections are shown by dotted lines in FIG. 2C.

In FIGS. 2A to 2C, an example is shown of the imaging system 10 which performs a selection operation of an image displayed on the display section 115, a button, or the like (for example, a button pressing operation) using the operation members such as the up/down and left/right button 123 and the OK button 124 provided on the outer side surface of the imaging apparatus 100.

The flash emission section 102 irradiates light beams to a subject based on control of the control section 130 (shown in FIG. 1) and increases light (reflected light) from a subject. According to this, it is possible to image even in a state where illuminance of the vicinity is low.

The shutter button 121 is an operation member for performing a shutter operation, and it is possible for a full-press or a half-press operation to be performed by a user. For example, in a case where the shutter button 121 is half-pressed, focus control which is optimal for the imaging is performed. In addition, in a case where the shutter button 121 is full-pressed, focus control which is optimal for the imaging is performed and the image data when the shutter button 121 is full-pressed is recorded in the recording device 116.

The mode dial 122 is a dial for setting each mode. For example, a normal AF mode, an auto imaging mode, an image display mode for displaying an image which is recorded in the recording device 116, and the like are set using operation of the mode dial 122.

The up/down and left/right operation button 123 is an operation button used in a case where an item such as a button or an image displayed on the display section 115 is selected and the currently selected item is moved up/down and left/right according to the pressed portion.

The OK button 124 is a button used in a case of determining a selection state of each item displayed on the display section 115. The cancel button 125 is a button used to release a determination in the case of determining a selection state of each item displayed on the display section 115. The power switch 126 is a switch which changes the power of the imaging apparatus 100 between being ON/OFF.

In addition, in the imaging system 10, a zoom operation is performed due to a manual operation of a user. The zoom operation is performed in a state where, for example, a user grips a predetermined portion of the interchangeable lens 200 using a hand. For example, when the zoom operation is performed due to the manual operation of a user, the zoom function is controlled according to the manual operation and it is possible to enlarge or reduce a subject included in an imaging image.

Here, contrast AF characteristics used by the imaging apparatus 100 will be described. The contrast AF is a method for extracting a high frequency component of the spatial frequency of an image in an AF region in regard to a predetermined region (ranging area) included in an imaging image and detecting a focusing position based on the illuminance difference (AF evaluation value) of the high frequency components. That is, by moving the focus lens to a position where the illuminance difference of the extracted high frequency components is the largest, it is possible to generate an imaging image which is in focus.

In addition, by using the contrast AF in the imaging system 10, it is possible to reduce the constituent members and it is possible to realize a smaller size and lower costs. Here, in the imaging system with an interchangeable lens format, AF accuracy is assumed to have degraded due to errors in the flange focal length when the interchangeable lens and the imaging apparatus (camera main body) are combined. However, by using contrast AF, it is possible to suppress degrading of the AF accuracy due to errors in the flange focal length.

In addition, the imaging apparatus 100 arranges the plurality of ranging areas in a picture plane of an imaging image during AF processing and selects the optimal ranging area from each of the ranging areas. That is, the optimal ranging area is selected from the plurality of ranging areas set in the imaging range. For example, by selecting the ranging area which includes a subject which is closest to the imaging apparatus 100 (for example, a main subject), it is possible to focus in on the subject which is closest to the imaging apparatus 100. According to this, for example, it is possible to prevent the focusing in on a subject other than the main subject (for example, a mountain in the background) (so-called prevention of focusing error). It is possible to match the focus to the ranging area (or the vicinity of the area) where the main subject (for example, the face of a person) is assumed to be using image recognition technology. According to this, for example, even in a case where the main subject is not in the center of an imaging image, it is possible to match the focus to the main subject.

Here, in the case where an imaging image is generated by the imaging apparatus 100, the degree of MTF degradation with regard to a change in image height is different due to individual differences in the interchangeable lenses used in the generation. That is, MTF characteristics are different due to individual differences in the interchangeable lens used in the generation of the imaging images. For example, in a case where the interchangeable lens with comparatively large MTF degradation is used and AF processing is executed with priority on a close-up, in a case where there is a close-up-side subject in a ranging area where the periphery has bad MTF, the ranging area is selected. In this manner, in a case where there is a close-up-side subject in a ranging area where the periphery has a comparatively bad MTF compared to a central region with a comparatively good MTF, the imaging apparatus 100 matches the focus with the subject on the close-up side. In this case, there is no sense of resolution since the periphery of the subject has bad MTF, and there is concern that the imaging image as a whole will have no sense of resolution since the focus is also not matched with the central region. As a result, for example, in the case where the imaging image is generated using the imaging apparatus which is able to be mounted with the interchangeable lens, it is important to select the ranging area in consideration of the MTF characteristics of the mounted interchangeable lens. Therefore, in the first embodiment of the invention, an example is shown where an appropriate focusing target area is selected from the plurality of ranging areas (for example, arranged in a 3×5 matrix formation) based on the subject distance and the MTF.

Functional Configuration Example of Imaging Apparatus

Figure 3:
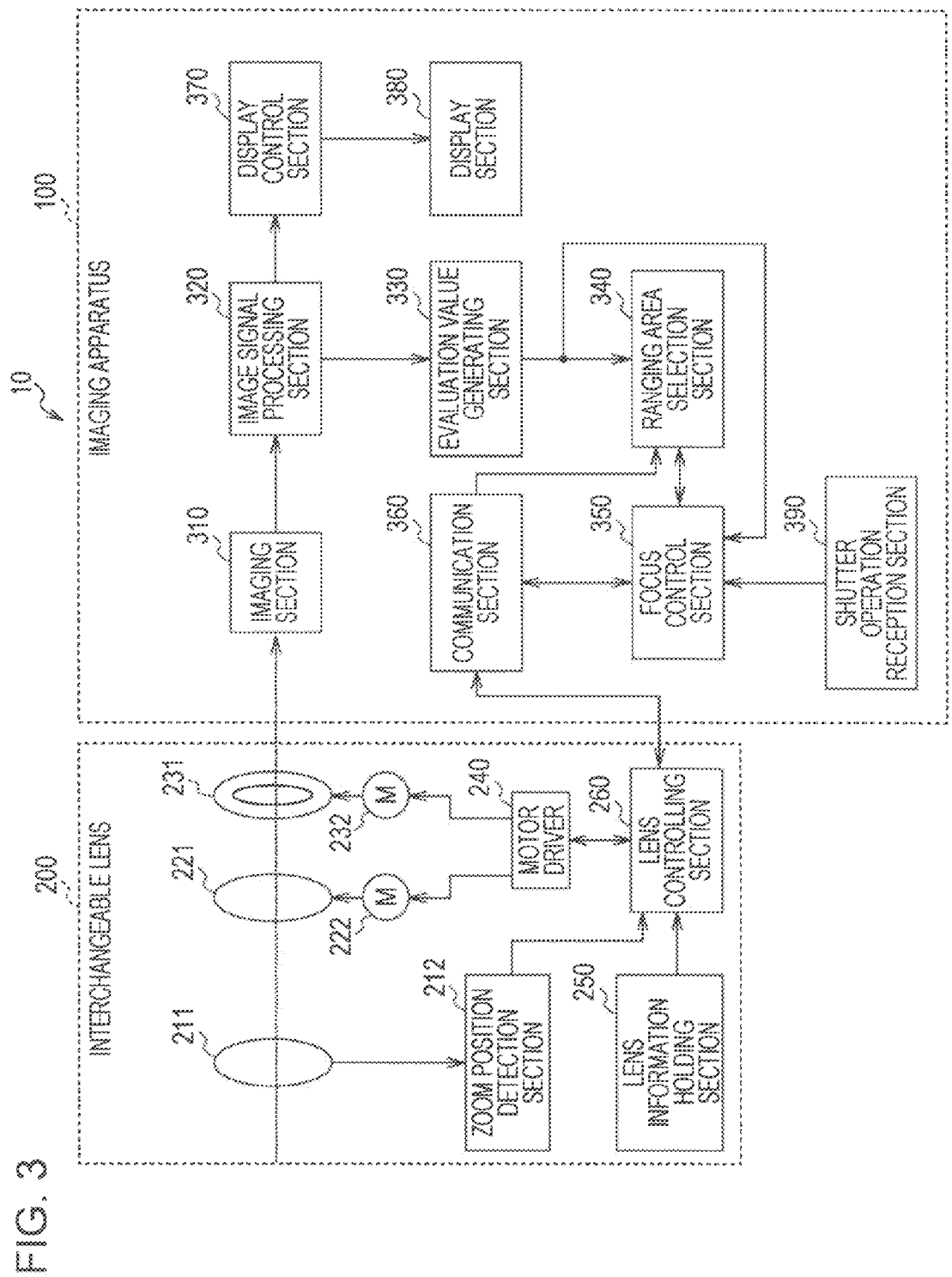
FIG. 3 is a block diagram illustrating a functional configuration example of an imaging apparatus according to the first embodiment of the invention.

FIG. 3 is a block diagram illustrating a functional configuration example of the imaging apparatus 100 according to the first embodiment of the invention. In FIG. 3, the internal configuration of the interchangeable lens 200 shown in FIG. 1 is shown along with the functional configuration of the imaging apparatus 100 for ease of description.

The imaging apparatus 100 is provided with an imaging section 310, an image signal processing section 320, an evaluation value generating section 330, a ranging area selection section 340, and a focus control section 350. In addition, the imaging apparatus 100 is provided with a communication section 360, a display control section 370, a display section 380, and a shutter operation reception section 390. Here, the imaging section 310 corresponds to, for example, the imaging element 111, the analog signal processing section 112, and the A/D conversion section 113 shown in FIG. 1. In addition, the image signal processing section 320 corresponds to, for example, the DSP 114 shown in FIG. 1. In addition, the evaluation value generating section 330, the ranging area selection section 340, the focus control section 350, and the communication section 360 correspond to, for example, the control section 130 shown in FIG. 1. In addition, the display control section 370 corresponds to, for example, the DSP 114 shown in FIG. 1. In addition, the display section 380 corresponds to, for example, the display section 115 shown in FIG. 1. In addition, the shutter operation reception section 390 corresponds to, for example, the operation section 120 shown in FIG. 1.

The imaging section 310 converts incident light from the subject incident via each of the lenses which configure the interchangeable lens 200 and generates an imaging image (image signals), and supplies the generated image signals (electrical signals) to the image signal processing section 320. Here, in FIG. 3, the diagrammatical representation and the description of the functional configuration relating to a recording processing, where the imaging image (image data) generated by the imaging section 310 is recorded, is omitted.

The image signal processing section 320 performs each type of signal processing of the image signals output from the imaging section 310 and the image signals on which image processing has been performed are output to the evaluation value generating section 330 and the display control section 370.

The evaluation value generating section 330 generates an AF evaluation value (contrast signal) from the image signals output from the image signal processing section 320 and outputs the generated AF evaluation value to the ranging area selection section 340 and the focus control section 350. That is, the evaluation value generating section 330 extracts a high frequency component of the spatial frequency of the image in each of the ranging area in regard to the plurality of ranging areas arranged in the imaging image which corresponds to the image signals output from the image signal processing section 320. Then, the evaluation value generating section 330 generates an illuminance difference (AF evaluation value) of the extracted high frequency components. The focusing position is detected based on the AF evaluation value generated in this manner.

The ranging area selection section 340 selects the ranging area (focusing target area) for the focus control section 350 to perform focus control and outputs information relating to the selected ranging area to the focus control section 350. Specifically, the ranging area selection section 340 obtains information used when selecting the ranging area (lens information such as MTF) from the interchangeable lens 200 via the communication section 360. Then, the ranging area selection section 340 selects the ranging area based on each piece of the obtained information, the AF evaluation value output from the evaluation value generating section 330, and information relating to focus control from the focus control section 350. That is, the ranging area selection section 340 calculates the subject distance and obtains the MTF of each of the ranging areas in regard to each of the plurality of ranging areas arranged in the imaging image generated by the imaging section 310. Then, the ranging area selection section 340 selects the ranging area (focusing target area) based on the obtained subject distance and MTF.

For example, the ranging area selection section 340 specifies the ranging area which includes a subject where the subject distance is the shortest (closest area) and the ranging area where the MTF is the highest (highest MTF area). Then, whether or not the areas are the same is determined, and in a case where the areas are the same, the ranging area is selected as the focusing target area.

In addition, in an area selection first processing, in a case where the closest area and the highest MTF area are not the same, in a case where the MTF of the closest area is small on the basis of a threshold value thM, the closest area is removed from the selection target of the focusing target area. In addition, in a case where the MTF of the closest area is large on the basis of the threshold value thM, in a case where a rate of decrease of the MTF of the ranging area with regard to the highest MTF area is small on the basis of a threshold value th1, the closest area is selected as the focusing target area (or a candidate). On the other hand, in a case where the rate of decrease of the MTF of the ranging area with regard to the highest MTF area is large on the basis of the threshold value th1, the closest area is removed from the selection target of the focusing target area.

In addition, in an area selection second processing, in the case where the closest area and the highest MTF area are not the same, in a case where the rate of decrease of the MTF of the closest area with regard to the highest MTF area is small on the basis of a threshold value th2, the closet area is selected as the focusing target area. In addition, in a case where the rate of decrease of the MTF of the ranging area with regard to the highest MTF area is large on the basis of the threshold value th2, in a case where difference values in the subject distances in relation to the subjects included in each of the areas are small on the basis of a threshold value thd, the highest MTF area is selected as the focusing target area. On the other hand, in a case where difference values in the subject distances in relation to the subjects included in each of the areas are large on the basis of the threshold value thd, the highest MTF area is removed from the selection target of the focusing target area. Here, it is preferable if the threshold value th1 is set to a larger value than the threshold value th2. In addition, the ranging area selection section 340 is an example of a selection section which is described in the scope of the claims.

The focus control section 350 performs communication control with the interchangeable lens 200 and performs focus control based on each piece of the information obtained via the communication section 360 using the communication and the AF evaluation value output from the evaluation value generating section 330. That is, the focus control section 350 performs focus control so as to focus in on the subject included in the ranging area selected by the ranging area selection section 340 (focusing target area). Here, the focus control section 350 performs focus control when, for example, a half-press operation or a full-press operation of the shutter button 121 is performed.

The communication section 360 performs communication with the lens control section 260 based on control of the focus control section 350. For example, the communication section 360 performs synchronous communication with the lens control section 260 based on control of the focus control section 350. Here, the communication section 360 is an example of a second communication section which is described in the scope of the claims.

The display control section 370 sequentially displays the imaging image on which image signal processing has been performed by the image signal processing section 320 as a through image in the display section 380. For example, the display control section 370 sequentially displays a through image in the display section 380 in an imaging waiting state when set in the still image imaging mode.

The display section 380 is a display section which displays the imaging image supplied from the display control section 370 as a through image.

The shutter operation reception section 390 is an operation reception section which receives a pressing operation of the shutter button 121 performed by a user and outputs the received operation content to the focus control section 350. Specifically, in the case where a half-press operation or a full-press operation of the shutter button 121 is performed, optimal focus control is performed by the focus control section 350. In addition, in the case where a full-press operation of the shutter button 121 is performed, focus control is performed and the imaging image generated by the imaging section 310 at the time of the full-press operation is recorded in the recording device 116 (shown in FIG. 1).

Figure 4A:
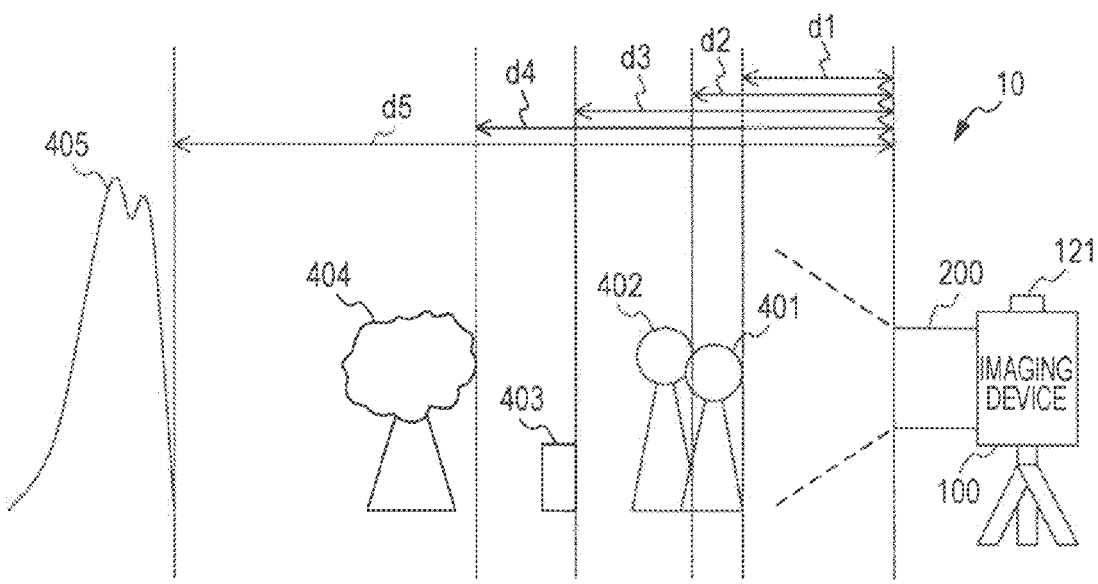
FIGS. 4A and 4B are diagrams illustrating an example of an imaging operation state using the imaging system according to the first embodiment of the invention and an imaging image generated due to the imaging operation state.
Figure 4B:
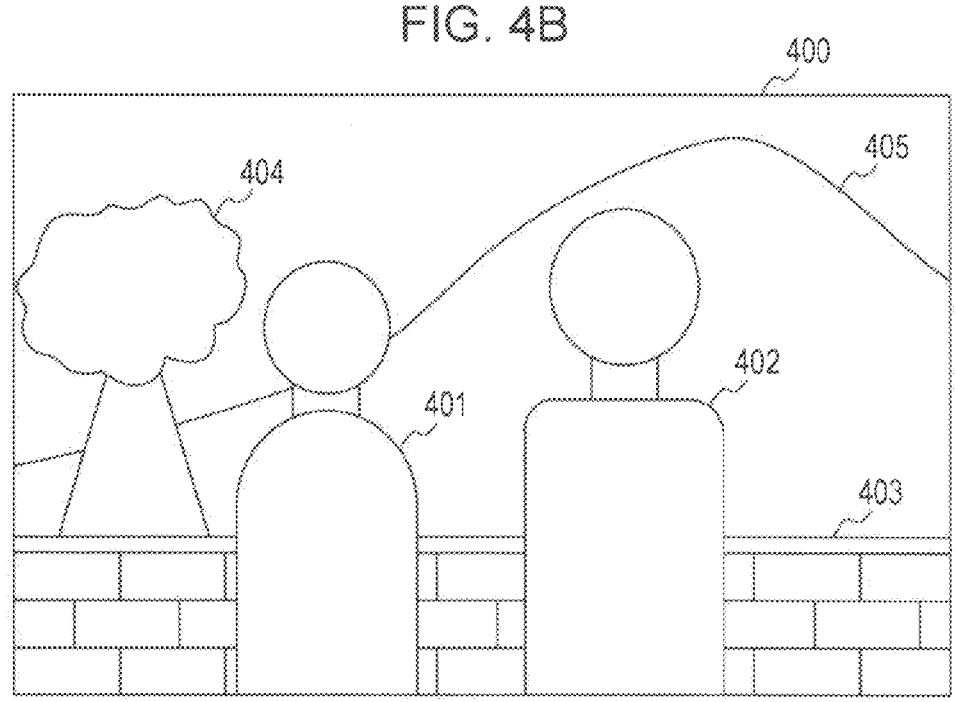

Imaging Operation used in Imaging System and Imaging Image Example generated using Imaging Operation FIGS. 4A and 4B are diagrams illustrating an example of an imaging operation state using the imaging system 10 according to the first embodiment of the invention and an imaging image generated due to the imaging operation state. In the example shown in FIGS. 4A and 4B, a case is shown as an example where people 401 and 402, a wall 403 which is set on the ground, a tree 404, and a mountain 405 are subjects and an imaging image 400 is generated.

In FIG. 4A, a case is schematically shown where a relationship between the imaging system 10 and the subjects is viewed from a side thereof in a state where the imaging operation is performed using the imaging system 10 (the imaging apparatus 100 and the interchangeable lens 200). In addition, distances from the imaging system 10 and each of the subjects are shown as subject distances d1 to d5.

Here, a calculation method of the subject distances d1 to d5 will be described. AF processing is performed in the case where a half-press operation or a full-press operation of the shutter button 121 is performed. In the AF processing, for example, the focus lens 221 is moved in a focus lens movement range (AF range) and the AF evaluation value (contrast) is calculated using the movement. Specifically, one operation (one AF processing), where movement of the focus lens 221 to a position where obtaining of contrast information is begun in the AF range and movement of the focus lens 221 for obtaining the contrast information are combined, is repeatedly performed. In this case, a graph is assumed where the vertical axis is an axis which shows the AF evaluation value (contrast) and the horizontal axis is an axis which shows the position of the focus lens 221. On the graph, in a case where there is a subject which is focused in on, the AF evaluation value traces out a curve (an inverted V-shaped curve) with regard to the position of the focus lens 221. In addition, the peak position (top) of the curve is a focusing position (exact focus).

In addition, each time one AF processing is executed, it is possible to capture the distances from the lens to the subjects (subject distances). That is, in a case where the subject distance is set to a, a distance from the lens until an image which is formed in the imaging element 111 is set to b, and the focusing distance of the lens is set to f, the following equation 1 holds.

$$(1/a)+(1/b)=1/f \qquad \text{equation 1}$$

Using equation 1, it is possible to determine the focus distance $a=1/((1/f)-(1/b))$. In addition, as shown in FIG. 5, in a case where the plurality of ranging areas are arranged in one imaging image, it is possible to determine the subject distance of each of the ranging areas each time one AF processing is executed.

In FIG. 4B, an example is shown of an imaging image which is generated in the imaging operation state shown in FIG. 4A. Here, the subjects included in the imaging image 400 shown in FIGS. 4B and 5A are simplified and shown for ease of description.

Arrangement Example of Ranging Areas in Imaging Image

Figure 5A:
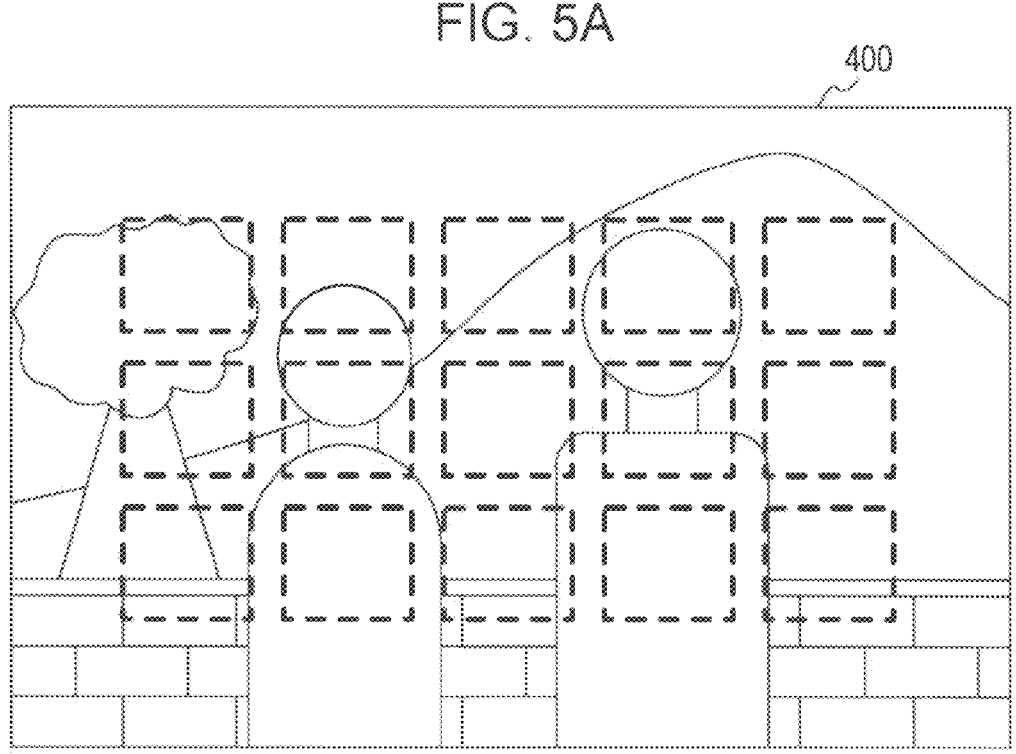
FIGS. 5A and 5B are diagrams illustrating an arrangement example of ranging areas in an imaging image set using a ranging area selection section according to the first embodiment of the invention.
Figure 5B:
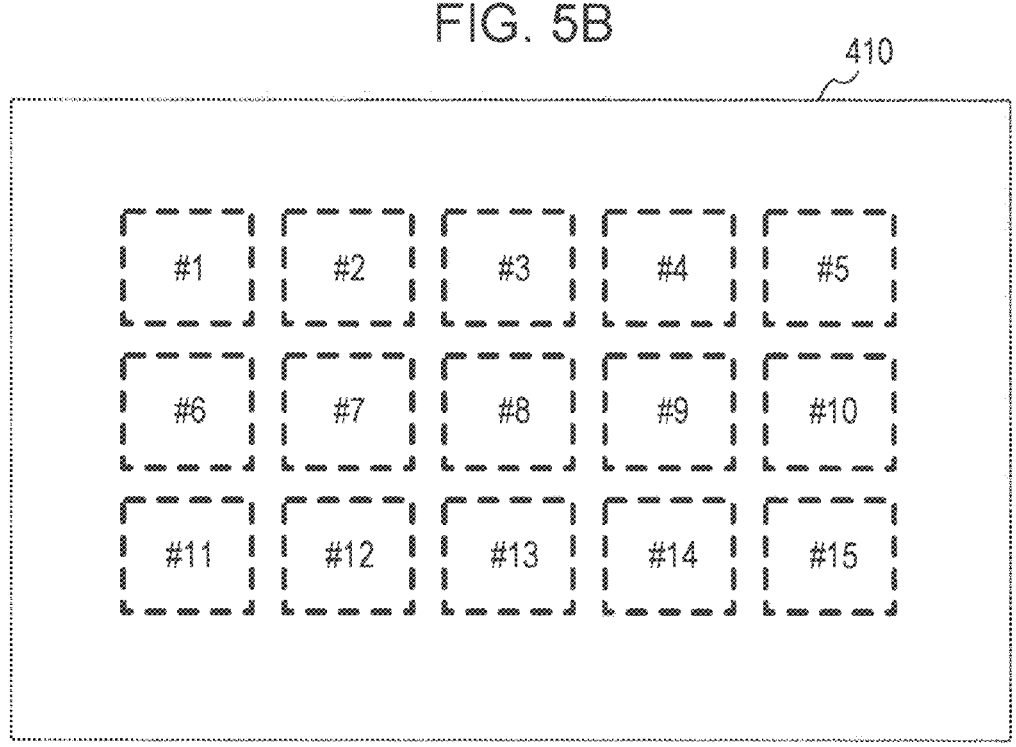

FIGS. 5A and 5B are diagrams illustrating an arrangement example of the ranging areas in the imaging image set using the ranging area selection section 340 according to the first embodiment of the invention. In FIG. 5A, an arrangement configuration example of the ranging areas in the imaging image 400 is shown. In FIG. 5A, an example is shown where 15 ranging areas are arranged in the imaging image 400. In addition, the imaging image 400 shown in FIG. 5A is the same as the imaging image 400 shown in FIG. 4B. In addition, the ranging areas arranged in the imaging image 400 are shown as rectangles with thick dashed lines.

In FIG. 5B, an arrangement configuration example of the ranging areas in the imaging image is shown. In FIG. 5B, an example is shown where the subjects (the people 401 and 402 and the like) in the imaging image 400 shown in FIG. 5A are omitted and the ranging areas (#1 to #15) are arranged in a rectangle 410 which corresponds to the imaging image 400.

Figure 6:
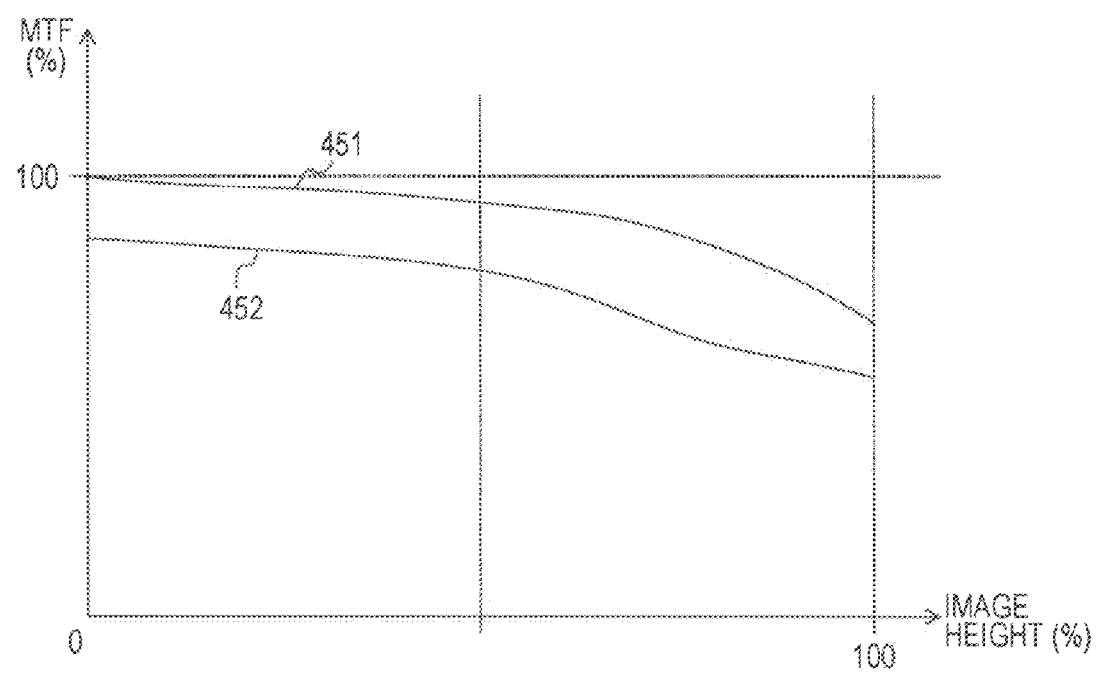
FIG. 6 is a diagram illustrating MTF characteristics of an interchangeable lens according to the first embodiment of the invention.

Example of Relationship between Image Height of Interchangeable Lens and MTF Characteristics FIG. 6 is a diagram illustrating the MTF characteristics of the interchangeable lens 200 according to the first embodiment of the invention. In FIG. 6, MTF characteristics are shown using MTF curves. MTF curves 451 and 452 shown in FIG. 6 are curves which represent the degree to which it is possible to faithfully reproduce the contrast of the subjects on the imaging image as spatial frequency characteristics.

In FIG. 6, the horizontal axis is an axis which shows an image height (%) and the vertical axis is an axis which shows a contrast value (%). Here, the image height is a value which shows a distance (mm) from the center of a picture plane. In addition, as described above, the MTF changes according to the focus distance f, the aperture value, the position of the focus lens 221, and the like. In addition, when the type of lens is different, the MTF characteristics also often change significantly. For example, the MTF curves (the MTF curve 451 and the MTF curve 452) change according to a change in the position of the aperture 231 of the interchangeable lens 200 (position of the aperture i and position of the aperture j).

As shown in FIG. 6, the MTF characteristics of the interchangeable lens 200 become smaller in accordance with the image height becoming higher. In addition, information relating to the MTF characteristics (MTF information) is held by the lens information holding section 250 of the interchangeable lens 200. Then, the MTF information held by the lens information holding section 250 is sent from the interchangeable lens 200 to the imaging apparatus 100 according to a send request from the imaging apparatus 100.

Operation Example of Imaging Apparatus

Next, an operation of the imaging apparatus 100 according to the first embodiment of the invention will be described with reference to the diagrams.

Figure 7:
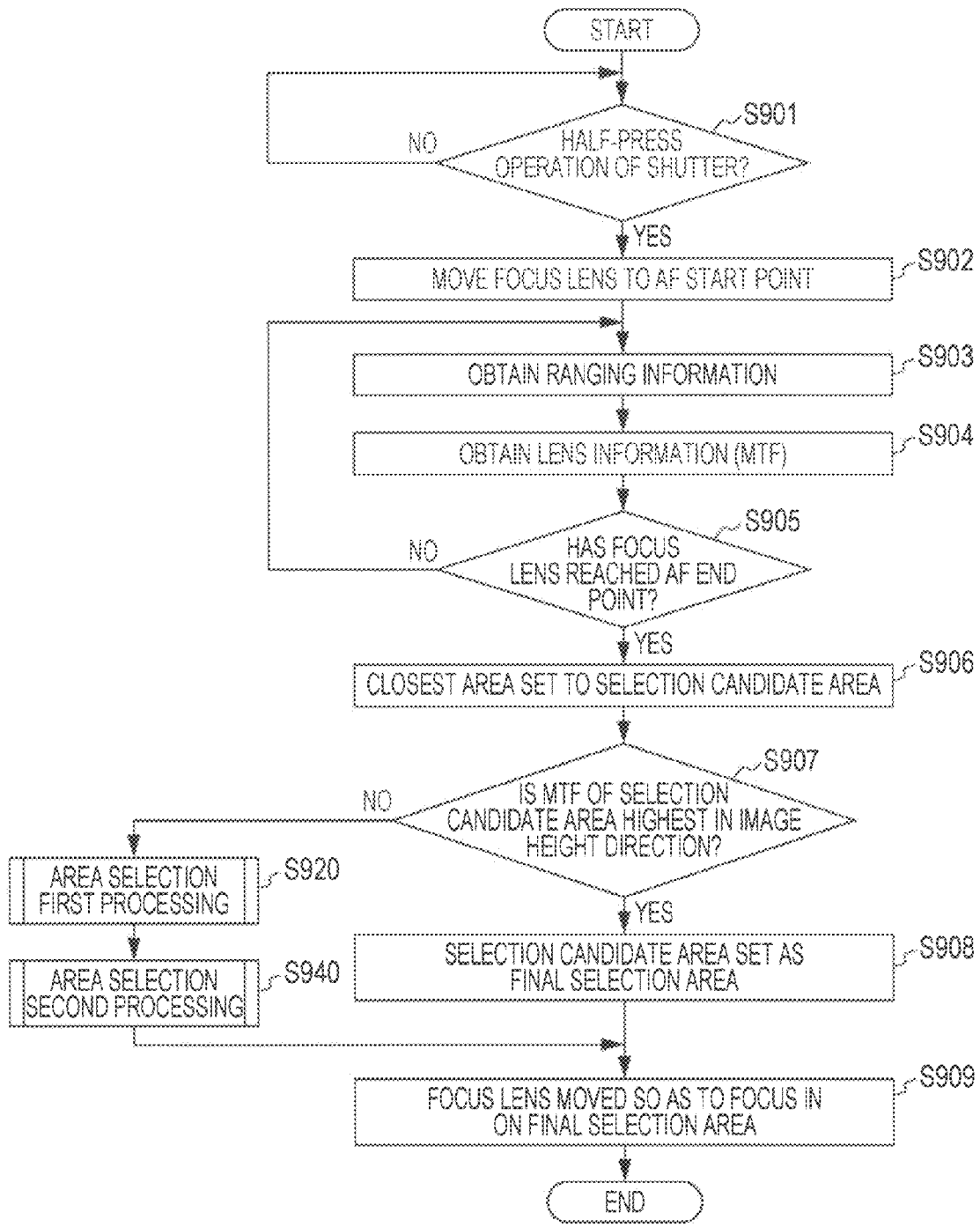
FIG. 7 is a flowchart illustrating one example of a processing sequence of autofocus processing using the imaging apparatus according to the first embodiment of the invention.

FIG. 7 is a flowchart illustrating one example of a processing sequence of autofocus processing using the imaging apparatus 100 according to the first embodiment of the invention.

Initially, it is determined whether or not a half-press operation of the shutter button 121 has been performed (step S901) and monitoring is continually performed in a case where a half-press operation has not been performed. On the other hand, in a case where a half-press operation of the shutter button 121 has been performed (step S901), the focus control section 350 moves the focus lens 221 to an AF start point of the set AF range (step S902).

Here, in the case where a half-press operation of the shutter button 121 has been performed, the focus control section 350 performs communication processing with the lens control section 260 of the interchangeable lens 200 via the communication section 360. According to the communication, the ranging area selection section 340 and the focus control section 350 obtain the lens information which is held in the lens information holding section 250. Here, the lens information held in the lens information holding section 250 includes the position of the focus lens 221 (position of the subject which is focused in on), the focus distance, the aperture value (F value), and the MTF.

In addition, the lens control section 260 obtains the MTF which corresponds to each piece of the lens information from the lens information holding section 250 based on the lens information such as the focus distance f obtained from the motor driver 240 and the position of the focus lens 221. Then, the lens control section 260 sends the obtained lens information (including the MTF) to the ranging area selection section 340 and the focus control section 350 via the communication section 360.

Next, the focus control section 350 moves the focus lens 221 in the set AF range. During the movement, the evaluation value generating section 330 generates the AF evaluation value (contrast signal) for each of the ranging areas and the ranging area selection section 340 obtains the generated AF evaluation values (ranging information) (step S903). In addition, the ranging area selection section 340 obtains the lens information (MTF information) which corresponds to the ranging area generated by the AF evaluation value from the lens control section 260 (step S904). In addition, using each piece of the information obtained in this manner, the ranging area selection section 340 calculates the subject distances of each of the ranging areas. Then, the ranging area selection section 340 holds the AF evaluation value, the lens information (MTF information), and the subject distance for each of the ranging areas.

Next, it is determined whether or not the position of the focus lens 221 has reached an end point of the AF range (step S905), and in a case where the position of the focus lens 221 has not reached the end point of the AF range, the processing returns to step S903 and the AF processing is repeatedly performed. On the other hand, in a case where the position of the focus lens 221 has reached the end point of the AF range (step S905), the ranging area selection section 340 selects a selection candidate area (step S906). That is, the ranging area (closest area) which includes the subject which exists farthest to the close-up side is selected as the selection candidate area out of the plurality of ranging areas (step S906). The selection candidate area is an area which becomes the candidate for selecting the focusing target area where the focus is finally matched (final selection area).

For example, as shown in FIG. 4A, since the subject which exists to the closest side is the person 401, any one (for example, ranging area #12) of the ranging areas arranged in the position which is equivalent to the person 401 (#2, #7, and #12 shown in FIG. 5B) is selected.

Next, the ranging area selection section 340 determines whether or not the selection candidate area is an area where the MTF is the highest in an image height direction (step S907). The area where the MTF is the highest in the image height direction is, for example, the ranging area where the center of the ranging area exists at a position where the image height (horizontal axis) becomes zero in the graph shown in FIG. 6. For example, in the example shown in FIGS. 5A and 5B, the ranging area #8 is the area where the MTF is the highest in the image height direction. As a result, for example, in a case where the ranging area #12 becomes the selection candidate area, the selection candidate area is determined not to be the area where the MTF is the highest in the image height direction (step S907). On the other hand, for example, in a case where the ranging area #8 becomes the selection candidate area, the selection candidate area is determined to be the area where the MTF is the highest in the image height direction (step S907).

Then, in the case where the selection candidate area is determined not to be the area where the MTF is the highest in the image height direction (step S907), the area selection first processing (step S920) and the area selection second processing (step S940) are performed. Here, the area selection first processing will be described in detail with reference to FIG. 8. In addition, the area selection second processing will be described in detail with reference to FIG. 9.

In addition, in the case where the selection candidate area is the area where the MTF is the highest in the image height direction (step S907), the ranging area selection section 340 sets the selection candidate area as the final selection area (step S908). Here, the final selection area is the area where focus matching is finally performed using AF processing (focusing target area). Here, the steps S906 to S908, S920, and S940 are an example of a selection sequence which is described in the scope of the claims.

In this manner, in a case where the ranging area selection section 340 selects the final selection area, the selection information relating to the selected final selection area is output to the focus control section 350. Then, the focus control section 350 moves the focus lens 221 so as to focus in on the final selection area (step S909) and the autofocus processing operation ends. Here, the step S909 is an example of a focus control sequence which is described in the scope of the claims.

Figure 8:
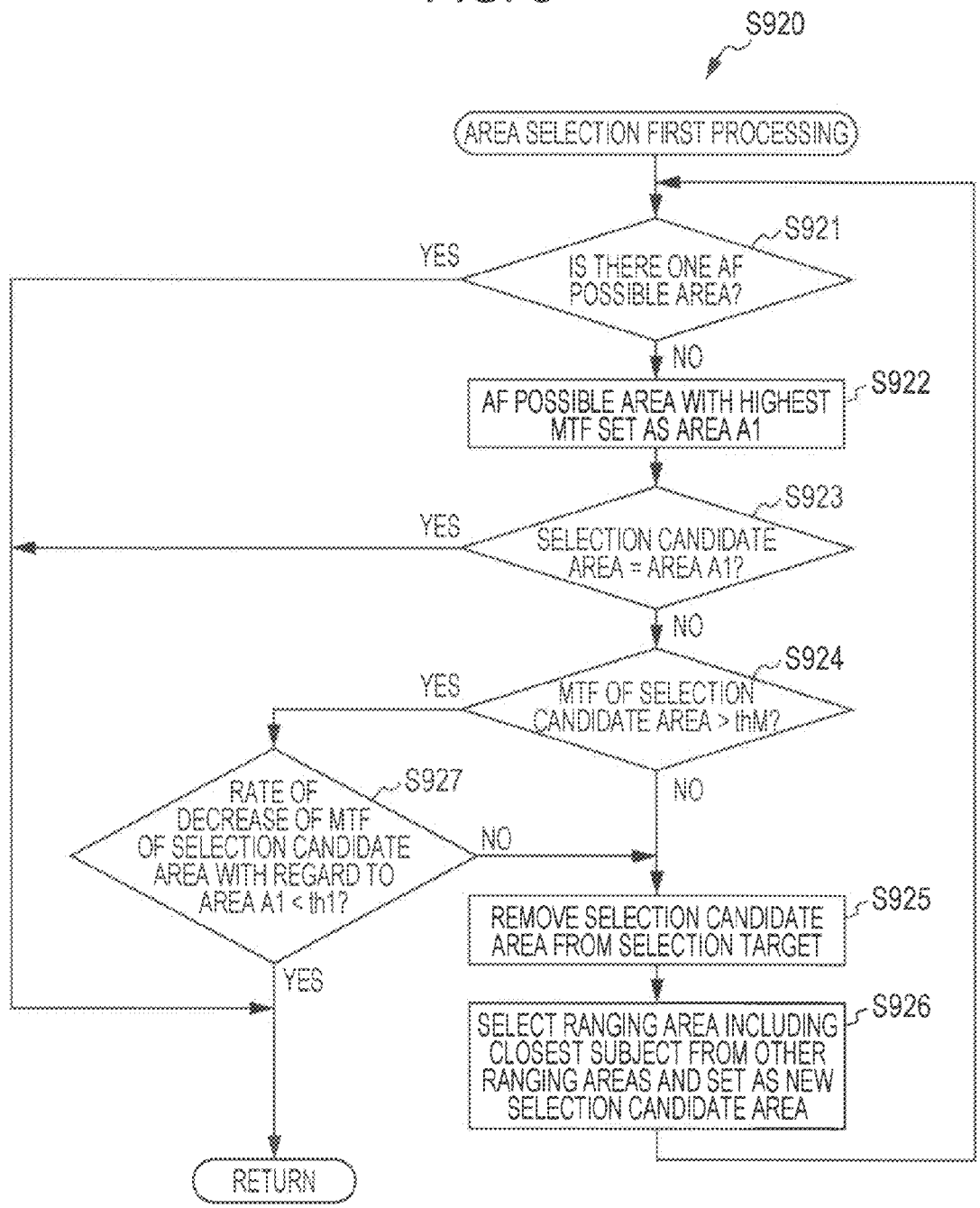
FIG. 8 is a flowchart illustrating one example of an area selection first processing out of the processing sequence of autofocus processing using the imaging apparatus according to the first embodiment of the invention.

FIG. 8 is a flowchart illustrating one example of the area selection first processing (processing sequence of step S920 shown in FIG. 7) out of the processing sequence of autofocus processing using the imaging apparatus 100 according to the first embodiment of the invention. The area selection first processing is a processing for narrowing the ranging area which are selection targets from the plurality of ranging areas.

Here, for example, AF processing is not possible in a case where the subject included in the ranging area has a low contrast, in a case where it is outside of the distance where imaging of the subject is possible, or the like. As a result, it is assumed that there are the ranging areas where AF processing is not possible out of the plurality of ranging areas.

Therefore, it is determined whether or not there is one ranging area (ranging area which has not been removed) where AF processing is possible (step S921), and in a case where there is one ranging area where AF processing is possible, the operation of the area selection first processing ends since further selection processing is not necessary.

On the other hand, in a case where there is not one ranging area where AF processing is possible (a case where there are a plurality of ranging areas where AF processing is possible) (step S921), the ranging area where the MTF is the highest out of each of the ranging areas is set as an area A1 (step S922). The area A1 is the ranging area where AF processing is possible.

Next, the ranging area selection section 340 determines whether or not the selection candidate area and the area A1 are the same (step S923). Then, in a case where the selection candidate area and the area A1 are not the same (step S923), the ranging area selection section 340 determines whether or not the MTF of the selection candidate area is larger than a MTF minimum threshold value thM (step S924). Here, it is possible to set the MTF minimum threshold value thM to be, for example, 50%.

In a case where the selection candidate area and the area A1 are not the same and the MTF of the selection candidate area is equal to or less than the MTF minimum threshold value thM (steps S923 and S924), the ranging area selection section 340 removes the selection candidate area from the selection targets of the focusing target area (step S925). Then, the ranging area selection section 340 newly selects the ranging area which includes the subject which exists to the closest side out of the other ranging areas (the ranging areas which have not been removed) as the selection candidate area (step S926) and the processing returns to step S921.

As a result, the final selection area is selected even in a state where there is no ranging area which is equal to or less than the MTF minimum threshold value thM. That is, in the case where the number of ranging areas where AF processing is possible (the ranging area which has not been removed) becomes one, the one ranging area (ranging area where AF processing is possible) becomes the final selection area (steps S941 and S945 shown in FIG. 9).

In addition, in a case where the selection candidate area and the area A1 are the same (step S923), the operation of the area selection first processing ends. In addition, in a case where the MTF of the selection candidate area is larger than the MTF minimum threshold value thM (step S924), the ranging area selection section 340 determines whether or not the rate of decrease of the MTF of the selection candidate area with regard to the area A1 is smaller than the threshold value th1 (step S927). Here, it is possible to determine a rate RD1 of decrease of the MTF of the selection candidate area with regard to the area A1 using the next equation 2.

$$RD1=(MTF_{A1}-MTF_{CC1})/MTF_{A1} \qquad \text{equation 2}$$

Here, $MTF_{A1}$ shows the MTF of the area A1 and $MTF_{CC1}$ shows the MTF of the selection candidate area. In addition, it is possible to set the threshold value th1 to a value, for example, from 10% to 20%.

Then, in a case where the rate RD1 of decrease of the MTF of the selection candidate area with regard to the area A1 is equal to or more than the threshold value th1 (step S927), the processing returns to step S925. On the other hand, in a case where the rate RD1 of decrease of the MTF of the selection candidate area with regard to the area A1 is less than the threshold value th1 (step S927), the operation of the area selection first processing ends.

That there are ranging areas which have been removed due to the area selection first processing in this manner is held in the ranging area selection section 340 and the ranging areas are not included as targets for selection processing in the area selection second processing (not included as possible targets for AF processing).

In addition, after the operation of the area selection first processing ends, in a case where the MTF of the subject on the close-up side is sufficient, the ranging area which includes the subject on the close-up side is selected. However, in a case where the MTF of the subject on the close-up side is not sufficient, the ranging area on a comparatively far side is selected.

Figure 9:
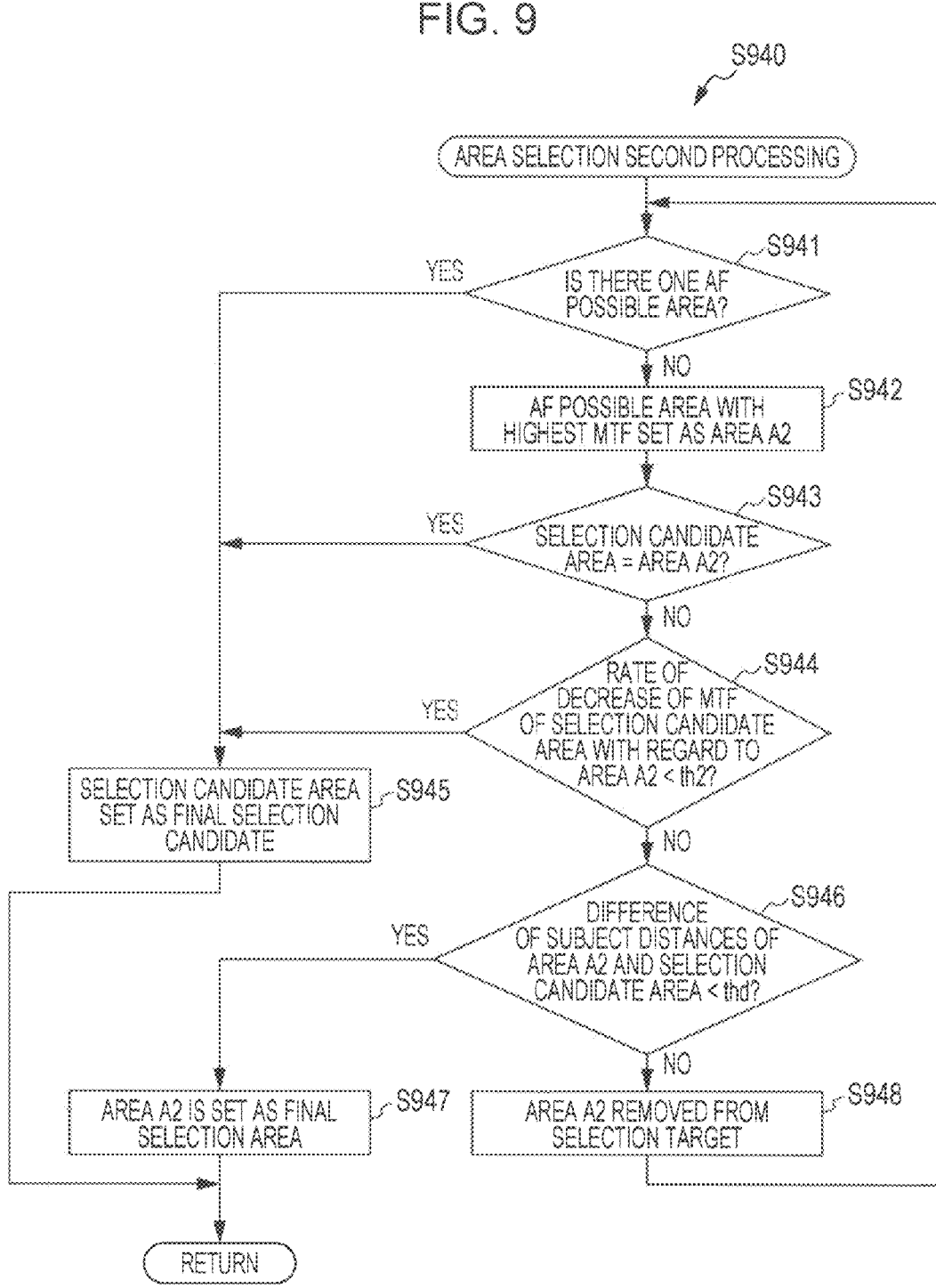
FIG. 9 is a flowchart illustrating one example of an area selection second processing out of the processing sequence of autofocus processing using the imaging apparatus according to the first embodiment of the invention.

FIG. 9 is a flowchart illustrating one example of an area selection second processing (processing sequence of step S940 shown in FIG. 7) out of the processing sequence of autofocus processing using the imaging apparatus 100 according to the first embodiment of the invention. The area selection second processing is a processing for performing precision adjustment to further narrow the ranging areas refined to a given standard using the area selection first processing (the ranging areas which have not been removed). Here, as described above, the ranging areas removed in the area selection first processing are not included as targets for selection processing also in the area selection second processing (not included as possible targets for AF processing).

Initially, in a case where the ranging areas where AF processing is possible have been narrowed down to one in the area selection first processing (step S941), the ranging area selection section 340 selects the ranging area as the final selection area (step S945) and the operation of the area selection second processing ends.

On the other hand, in a case where there is a plurality of ranging areas where AF processing is possible (step S941), the ranging area selection section 340 selects the area where the MTF is the highest from the ranging areas where AF processing is possible and the ranging area is set as an area A2 (step S942).

Next, the ranging area selection section 340 determines whether or not the selection candidate area and the area A2 are the same (step S943). Then, in a case where the selection candidate area and the area A2 are the same (step S943), the ranging area selection section 340 selects the selection candidate area as the final selection area (step S945) and the operation of the area selection second processing ends. On the other hand, the ranging area selection section 340 determines whether or not the rate of decrease of the MTF of the selection candidate area with regard to the area A2 is smaller than the threshold value th2 (step S944). Here, it is possible to determine a rate RD2 of decrease of the MTF of the selection candidate area with regard to the area A2 using the next equation 3.

$$RD2=(MTF_{A2}-MTF_{CC1})/MTF_{A2} \qquad \text{equation 3}$$

Here, $MTF_{A2}$ shows the MTF of the area A2 and $MTF_{CC1}$ shows the MTF of the selection candidate area. In addition, it is preferable to set the threshold value th2 to a value small than the threshold value th1 and it is possible to set the threshold value th2 to a value, for example, from 5% to 10%.

Then, in a case where the rate RD2 of decrease of the MTF of the selection candidate area with regard to the area A2 is smaller than the threshold value th2 (step S944), the ranging area selection section 340 selects the selection candidate area as the final selection area (step S945) and the operation of the area selection second processing ends.

On the other hand, in a case where the rate RD2 of decrease of the MTF is equal to or more than the threshold value th2 (step S944), the ranging area selection section 340 determines whether or not a difference in the subject distances which correspond to each of the area A2 and the selection candidate area is smaller than the threshold value thd (step S946). Here, in a case where the difference in the subject distances is determined using a focal depth conversion, it is possible to set the threshold value thd to, for example, a value of approximately a depth of 1. Here, in the case where the difference in the subject distance is determined using a focal depth conversion, it is possible to determine by a calculation using b in equation 1 (1/a)+(1/b)=1/f described above.

Here, in the case where the difference in the subject distances which correspond to each of the area A2 and the selection candidate area is determined using a focal depth conversion, each of the values used at this time may be sequentially obtained from the interchangeable lens 200. For example, the imaging apparatus 100 sends the subject distance which corresponds to the selection candidate area to the interchangeable lens 200 and performs a send request of an image plane position corresponding to this. In regard to the send request, the interchangeable lens 200 sends an image plane position P1 which corresponds to the selection candidate area to the imaging apparatus 100. In the same manner, the imaging apparatus 100 sends the subject distance which corresponds to the area A2 to the interchangeable lens 200 and performs a send request of an image plane position corresponding to this. In regard to the send request, the interchangeable lens 200 sends an image plane position P2 which corresponds to the area A2 to the imaging apparatus 100. Then, using the calculation of a difference value (P1−P2) of each of the received image plane positions, it is possible to determine the difference value of the subject distances using a focal depth conversion. Here, it is possible for the imaging apparatus 100 to perform a send request to the interchangeable lens 200 and also obtain each value used in other calculations.

Then, in a case where the difference in the subject distances which corresponds to each of the area A2 and the selection candidate area is smaller than the threshold value thd (step S946), the ranging area selection section 340 selects the area A2 as the final selection area (step S947). Then, the operation of the area selection second processing ends. In this manner, in the case where the difference in the subject distances which corresponds to each of the area A2 and the selection candidate area is smaller than the threshold value thd, it is assumed that degrading of the focus of the subject which is on the close-up side is lower even if focusing is performed so that the area A2 with the high MTF is in exact focus. As a result, the area A2 is selected as the final selection area.

On the other hand, in a case where the difference in the subject distances which correspond to each of the area A2 and the selection candidate area is equal to or larger than the threshold value thd (step S946), the ranging area selection section 340 removes the area A2 from the selection target of the focusing target area (step S948) and the processing returns to step S941. In this manner, in a case where the difference in the subject distances which correspond to each of the area A2 and the selection candidate area is equal to or larger than the threshold value thd, it is assumed that adverse effects such as significant focus errors are generated when the focus is matched with the area A2. As a result, the area A2 is removed from the selection target of the focusing target area. After this, until the ranging areas where AF processing is possible are narrowed down to one (step S941), a new area A2 is set (step S942) and each processing sequence is repeatedly performed (steps S943 to S947). According to this, it is possible to select the optimal ranging area.

Figure 10A:
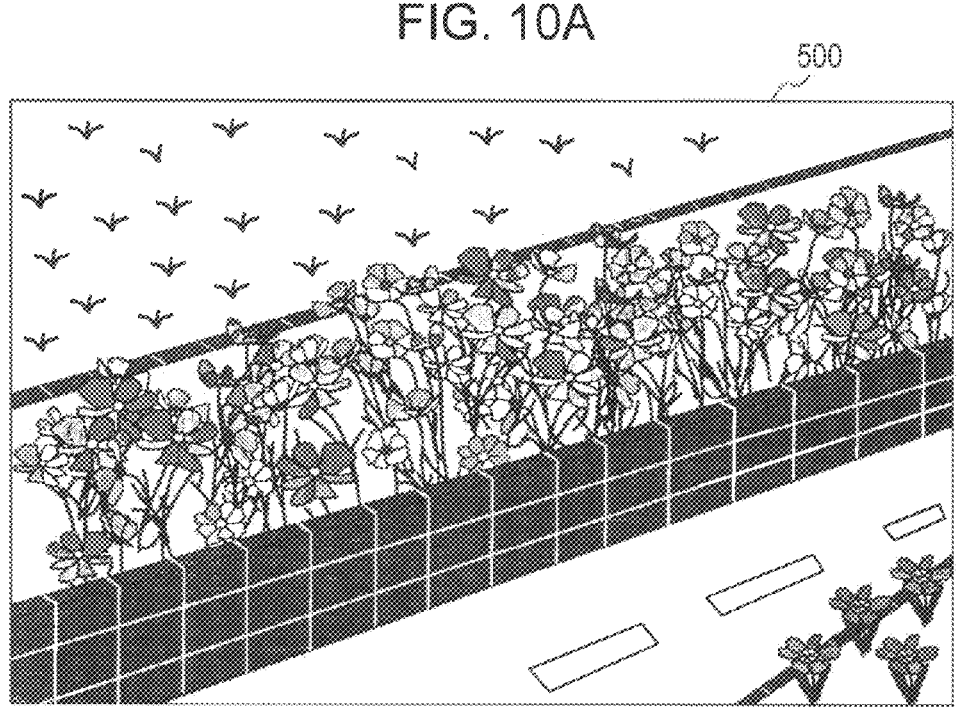
FIGS. 10A and 10B are diagrams illustrating an example of an imaging image generated using the imaging system according to the first embodiment of the invention.
Figure 10B:
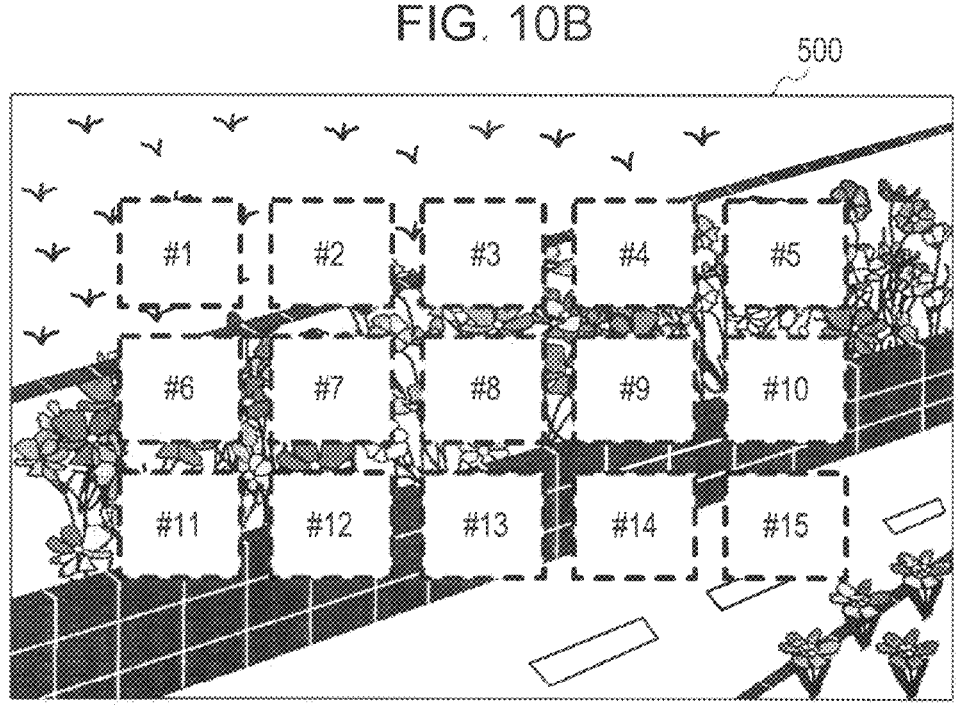

In this manner, by selecting the ranging area where focusing is performed in consideration of the subject distance and the MTF, it is possible to reduce the inadvertent performing of focusing with regard to the ranging areas with low MTF. According to this, even in a case where, for example, the ranging areas are arranged in a comparatively wide range in the imaging image, it is possible to limit the ranging areas using the range of the MTF and it is possible to appropriately select the ranging area where focusing is performed. In addition, even in a case where, for example, the subjects are continuous in a depth direction, since it is possible to appropriately select the ranging area where focusing is performed, it is possible to record an excellent imaging image (photograph). Here, for example, as a state where the subjects are continuous in the depth direction, a case is assumed where imaging is performed at an angle with regard to a progress direction (longitudinal direction) of a flowerbed, a bridge, a road, or the like. In FIGS. 10A and 10B, a case where a flowerbed is imaged is shown as an example.

Imaging Image Example generated by Imaging Operation Using Imaging System

FIGS. 10A and 10B are diagrams illustrating an example of an imaging image generated using the imaging system 10 according to the first embodiment of the invention.

In FIG. 10A, an imaging image 500 is shown which is generated by an imaging operation where a plurality of flowers, which is planted in a flowerbed arranged on one side of a road, is the main subject. In FIG. 10B, an arrangement configuration example of the ranging areas of the imaging image 500 is shown. In the imaging image 500, 15 ranging areas are arranged in the same manner as FIGS. 5A and 5B. In addition, the ranging areas arranged in the imaging image 500 shown in FIG. 10B are shown as rectangles with thick dashed lines (white inside) and reference numerals of the ranging areas (#1 to #15) are shown in each of the rectangles.

A case is assumed where the focusing target area is selected from the 15 ranging areas arranged in the imaging image 500 generated in this manner. For example, in a case where the focusing target area is selected based on the subject distance, it is assumed that the ranging areas #11 and #12 arranged in the vicinity of the front wall of the flowerbed are selected. However, in a case where, for example, the MTF of the ranging areas #11 and #12 is comparatively low, there is concern that the imaging image may be set where the flowers are the main subject (the vicinity of the ranging areas #7 to #9) and an appropriate imaging image may not be recorded. That is, the vicinity of the image height where there is a close-up subject (the ranging areas #11 and #12) has no sense of resolution since the MTF is bad and there is a concern that the imaging image may have no sense of resolution (that is, the imaging image has no overall sense of resolution) since there is no focus in the vicinity of the center (the ranging area #8).

With regard to this, in the first embodiment of the invention, the focusing target area is selected based on the subject distance and the MTF. As a result, in the case where, for example, the MTF of the ranging areas #11 and #12 is comparatively low, it is possible to select the ranging area which includes the flowers which are the main subject (for example, the ranging area #8). According to this, it is possible to record an appropriate imaging image which as an overall sense of resolution as the imaging image where the flowers are the main subject.

In this manner, according to the first embodiment of the invention, it is possible to select the appropriate ranging area (the focusing target area) from the plurality of ranging areas. That is, it is possible to set the appropriate ranging area in consideration of the MTF characteristics. For example, in a case such as where the MTF of the ranging area on the closest side is degraded more than the vicinity of the center, in a case where the subject is in the vicinity of the center and AF processing is possible, it is possible to perform selection with priority given to the ranging areas in the vicinity of the center with high MTF. According to this, it is possible to prevent the degrading of the sense of resolution in the overall picture plane of the imaging image. Here, in the first embodiment of the invention, for ease of description, an example is shown where a comparatively small number (3×5) of the ranging areas are arranged, but even in a case where, for example, a different number (for example, 5×5) of the ranging areas are arranged, it is possible to apply the first embodiment of the invention.

2. Second Embodiment

In the first embodiment of the invention, an example is shown where the focusing target area (final selection area) is selected from the plurality of ranging areas arranged based on a constant regularity (for example, arranged in a 3×5 matrix formation) based on the subject distance and the MTF. Here, for example, in a case where a face is included in the imaging image, it is possible to set the ranging area with regard to the face. In addition, in a case where the imaging image includes a plurality of faces, each of the faces is detected and it is possible to set the ranging areas with regard to each of the detected faces. Therefore, in a case one of the ranging areas is selected from the ranging areas where there are the respective faces, it is possible to apply the first embodiment of the invention. Therefore, in a second embodiment, an example will be described where one of the ranging areas is selected from the ranging areas which are set with regard to the plurality of faces included in the imaging image. In addition, the configuration of the imaging apparatus according to the second embodiment of the invention is substantially the same as the example shown in FIGS. 1 to 3. As a result, in regard to portions which are common with the first embodiment of the invention, the same reference numerals are attached and a portion of the description thereof (internal configuration, external configuration, and the like) is omitted.

Functional Configuration Example of Imaging Apparatus

FIG. 11 is a block diagram illustrating a functional configuration example of an imaging apparatus 600 according to the second embodiment of the invention. In FIG. 11, the internal configuration of the interchangeable lens 200 shown in FIG. 1 is shown along with the functional configuration of the imaging apparatus 600 for ease of description.

The imaging apparatus 600 is provided with a face detection section 610 and a ranging area selection section 620. In addition, the face detection section 610 corresponds to, for example, the DSP 114 and the control section 130 shown in FIG. 1. In addition, the image signal processing section 320 performs each type of signal processing of the image signals output from the imaging section 310 and the image signals (the imaging image) on which image processing has been performed are output to the face detection section 610.

The face detection section 610 detects a face of a person included in the imaging image output from the image signal processing section 320 and outputs information relating to the detected face (face information) to the ranging area selection section 620. The face information is information which includes, for example, the position in the imaging image and the size of the detected face of a person. Here, as a detection method of a face included in the imaging image, it is possible to use, for example, a face detection method (for example, refer to Japanese Unexamined Patent Application Publication No. 2004-133637) using matching of a content image and a template where face illumination distribution information is recorded. In addition, it is possible to use a face detection method based on precision adjustment of a skin-colored portion or a face of a person included in the imaging image. According to the face detection methods, it is possible to determine the face information (position in the imaging image and the size of the face of a person). Here, the face detection section 610 is an example of a detection section which is described in the scope of the claims.

Figure 12:
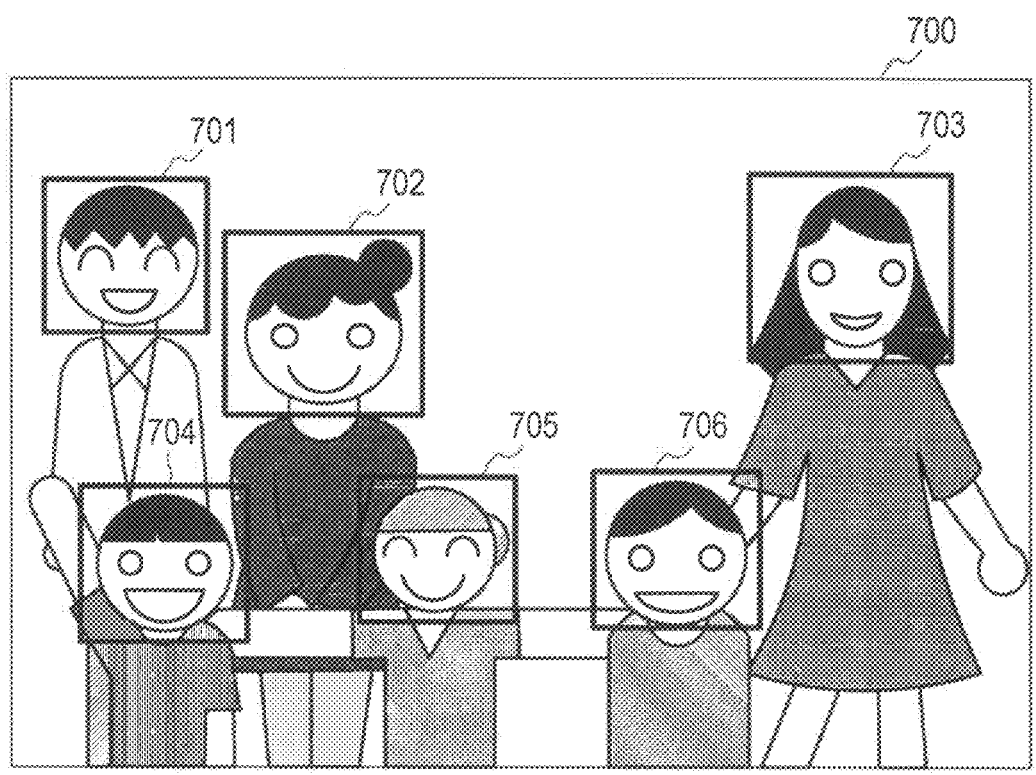
FIG. 12 is a diagram illustrating an arrangement example of ranging areas in an imaging image set using a ranging area selection section according to the second embodiment of the invention.

The ranging area selection section 620 arranges the ranging area to the face detected by the face detection section 610 and selects the focusing target area (the final selection area) from each of the ranging areas. Here, since the selection method of the focusing target area is the same as the first embodiment of the invention, description thereof is omitted here. In addition, an arrangement example of the ranging areas is shown in FIG. 12. Here, the ranging area selection section 620 is an example of a selection section which is described in the scope of the claims.

Arrangement Example of Ranging Area in Imaging Image

FIG. 12 is a diagram illustrating an arrangement example of the ranging areas in the imaging image set using the ranging area selection section 620 according to the second embodiment of the invention. An imaging image 700 shown in FIG. 12 is the imaging image generated with a plurality of people as the subject and faces of the plurality of people are detected using the face detection section 610. In addition, ranging areas 701 to 706 are arranged with regard to the faces detected in this manner using the ranging area selection section 620. The focusing target area (final selection area) is selected from the plurality of ranging areas 701 to 706 arranged in this manner based on the subject distance and the MTF.

For example, in a case where the focusing target area is selected based on the size of the detected face, it is assumed that the ranging areas 701 to 703, which are arranged on the faces of the adults where the size of the face is comparatively large, are selected. However, it is often preferable that the ranging areas 704 to 706, which are arranged on the faces of the children who are in front, are selected. Therefore, in the second embodiment of the invention, since the focusing target area is selected based on the subject distance and the MTF, it is possible to select the ranging area 705 which is arranged on, for example, the child in the front and center. According to this, it is possible to record an appropriate imaging image with a sense of resolution as the imaging image with the children as the main subject.

Here, in the second embodiment of the invention, the face of a person is described as an example of a specific target object which is a detection target, but it is possible to apply the second embodiment even to objects other than the faces of people. For example, it is possible to apply the second embodiment also in cases where, for example, one or a plurality of animals (for example, pets) such as mammals, reptiles, and fish, cars, and planes are the specific target object.

3. Third Embodiment

In the first embodiment of the invention, an example is shown where the ranging area is selected in the imaging system 10 where an attachable and detachable type of the interchangeable lens 200 is mounted on the imaging apparatus 100. However, it is possible to apply the first embodiment of the invention to an imaging apparatus such as a digital still camera with a built-in lens. Therefore, in a third embodiment of the invention, an example will be described where the ranging area is selected in the imaging apparatus with a built-in lens. In addition, the configuration of the imaging apparatus according to the third embodiment of the invention is substantially the same as the example shown in FIGS. 1 to 3. As a result, in regard to members which are common with the first embodiment of the invention, the same reference numerals are attached and a portion of the description thereof (external configuration, functional configuration, and the like) is omitted.

Internal Configuration Example of Imaging Apparatus

Figure 13:
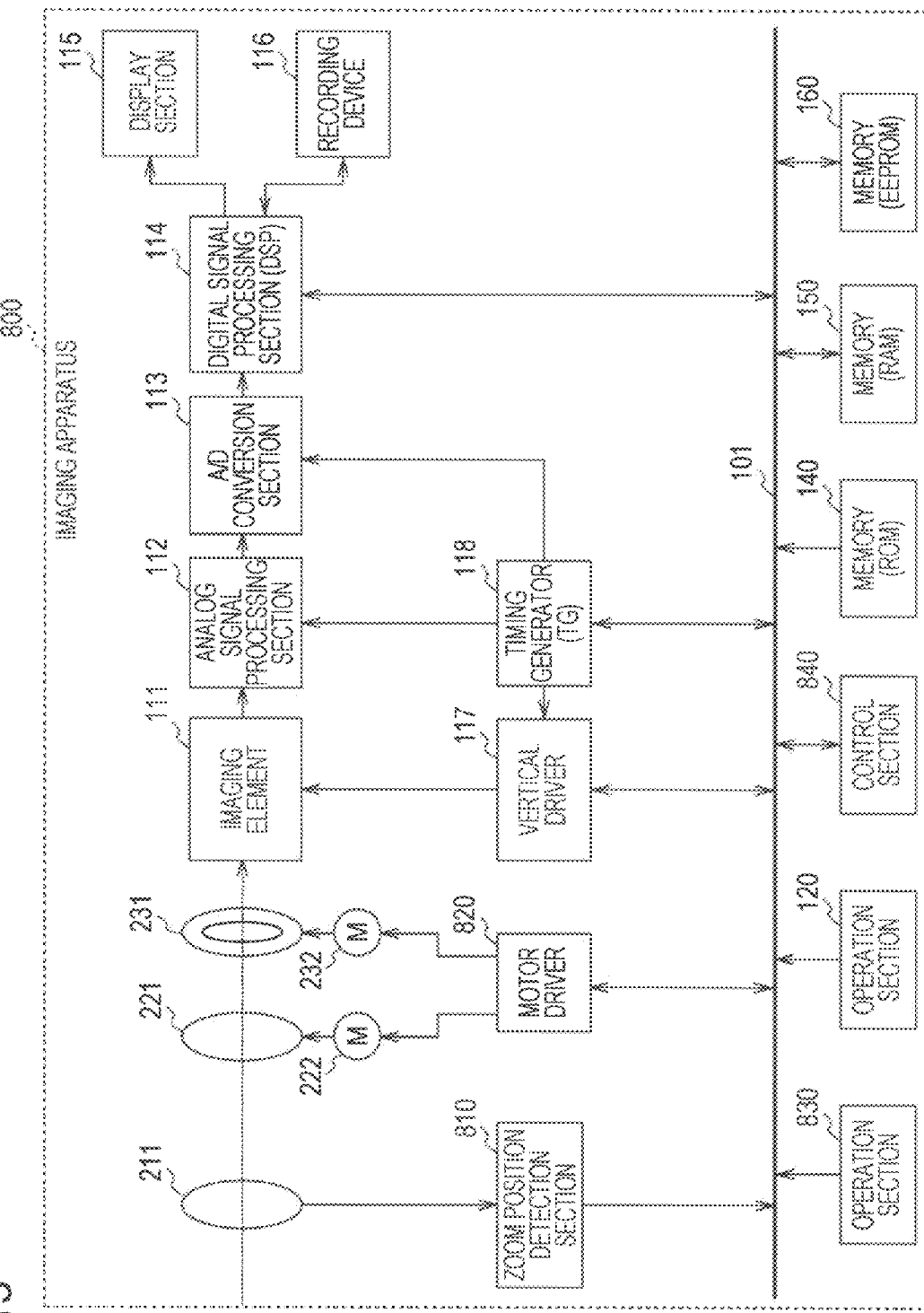
FIG. 13 is a block diagram illustrating an internal configuration example of an imaging apparatus according to a third embodiment of the invention.

FIG. 13 is a block diagram illustrating an internal configuration example of an imaging apparatus 800 according to the third embodiment of the invention. The imaging apparatus 800 is provided with a zoom position detection section 810, a motor driver 820, a lens information holding section 830, and a control section 840. Here, the zoom position detection section 810, the motor driver 820, the lens information holding section 830, and the control section 840 are connected via the system bus 101 so as to be able to communicate with each other.

The zoom position detection section 810 detects the position of the zoom lens 211 which is driven due to a zoom operation by a user, and outputs the detection result to the control section 840. Here, the zoom position detection section 810 corresponds to the zoom position detection section 212 shown in FIG. 1.

The focus lens driving motor 222 moves the focus lens 221 based on control of the motor driver 820. The aperture driving motor 232 drives the aperture 231 based on control of the motor driver 820.

The motor driver 820 is a driver which drives the focus lens driving motor 222 and the aperture driving motor 232 based on control of the control section 840. Here, the motor driver 820 corresponds to the motor driver 240 shown in FIG. 1.

The lens information holding section 830 is a memory which holds unique information (lens information) relating to each optical member (the focus lens 221, the aperture 231, and the like) which configure the optical system, and supplies the held information to the control section 840. Here, the lens information holding section 830 corresponds to the lens information holding section 250 shown in FIG. 1. In addition, the unique information may be held in a different memory (memory (ROM) 140 or the like).

The control section 840 controls each section of the imaging apparatus 100 (including each of the optical members which configure the optical system). Here, the control section 840 corresponds to the control section 130 and the lens control section 260 shown in FIG. 1.

In this manner, since it is possible to apply the first embodiment of the invention also in the imaging apparatus with a built-in lens as well as the imaging apparatus with an interchangeable lens, it is possible for MTF information to be widely applied to improving performance of multi AF in various types of the imaging apparatuses. In addition, in the embodiments of the invention, an example using contrast AF is shown, but it is possible to apply the embodiments of the invention even in a case where, for example, phase difference AF is used (AF using a phase difference detection method).

Here, the embodiments of the invention show examples for realizing the invention, and as shown in the embodiments of the invention, the items of the embodiments of the invention and the specific items of the invention in the scope of the claims respectively have a corresponding relationship. In the same manner, the specific items of the invention in the scope of the claims and the items in the embodiments with the same name respectively have a corresponding relationship. However, the invention is not limited by the embodiments and is possible to be realized by making various modifications to the embodiments in a range without departing from the concept of the invention.

In addition, the processing sequence described in the embodiments of the invention may be interpreted as a method which has the sequence series or may be interpreted as a program for executing the sequence series on a computer or a recording medium which records the program. As the recording medium, it is possible to use, for example, a CD (Compact Disk), an MD (Mini Disc), a DVD (Digital Versatile Disc), a memory card, a Blu-ray Disc (registered trademark), and the like.

The present application contains subject matter related to that disclosed in Japanese Priority Patent Application JP 2010-122168 filed in the Japan Patent Office on May 28, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an imaging section which converts incident light which is incident from a subject via a lens and generates an imaging image;
    a selection section which, in regard to each of a plurality of ranging areas arranged in the generated imaging image, obtains a subject distance which is a distance from the lens to a subject included in the ranging area and an MTF for each of the ranging areas in relation to the lens, and selects a ranging area which includes a subject to be a focusing target as a focusing target area based on the obtained subject distance and MTF; and
    a focus control section which performs focus control so as to focus on a subject included in the selected focusing target area, wherein
    in a case where it is determined whether or not the ranging area which includes the subject where the subject distance is the shortest and the ranging area where the MTF is the highest are the same and the ranging areas are not the same, in a case where the MTF of the ranging area which includes the subject where the subject distance is the shortest is small on the basis of a threshold value, the selection section removes the ranging area from the selection target of the focusing target area and performs the determination with regard to each of the ranging areas which are selection targets of the focusing target area after the removal.

2. The imaging apparatus according to claim 1,
    wherein, in a case where a ranging area which includes a subject where the subject distance is the shortest and a ranging area where the MTF is the highest are the same, the selection section selects the ranging area as the focusing target area.

3. The imaging apparatus according to claim 1,
    wherein, in the case where the ranging area which includes the subject where the subject distance is the shortest and the ranging area where the MTF is the highest are not the same, in a case where a rate of decrease of the MTF of the ranging area which includes the subject where the subject distance is the shortest with regard to the ranging area where the MTF is the highest is small on the basis of a threshold value, the selection section selects the ranging area which includes the subject where the subject distance is the shortest as the focusing target area.

4. The imaging apparatus according to claim 1,
    wherein, in the case where the ranging area which includes the subject where the subject distance is the shortest and the ranging area where the MTF is the highest are not the same and the MTF of the ranging area which includes the subject where the subject distance is the shortest is large on the basis of a threshold value, in the case where the rate of decrease of the MTF of the ranging area which includes the subject where the subject distance is the shortest with regard to the ranging area where the MTF is the highest is small on the basis of a threshold value, the selection section selects the ranging area which includes the subject where the subject distance is the shortest as the focusing target area.

5. The imaging apparatus according to claim 1,
    wherein, in the case where the ranging area which includes the subject where the subject distance is the shortest and the ranging area where the MTF is the highest are not the same and the MTF of the ranging area which includes the subject where the subject distance is the shortest is large on the basis of a threshold value, in a case where the rate of decrease of the MTF of the ranging area which includes the subject where the subject distance is the shortest with regard to the ranging area where the MTF is the highest is large on the basis of a threshold value, the selection section removes the ranging area which includes the subject where the subject distance is the shortest from the selection target of the focusing target area.

6. The imaging apparatus according to claim 1,
wherein, in the case where the ranging area which includes the subject where the subject distance is the shortest and the ranging area where the MTF is the highest are not the same and the rate of decrease of the MTF of the ranging area which includes the subject where the subject distance is the shortest with regard to the ranging area where the MTF is the highest is large on the basis of a threshold value, in a case where difference values in the subject distances in relation to the subjects included in each of the ranging areas are small on the basis of a threshold value, the selection section selects the ranging area where the MTF is the highest as the focusing target area.

7. The imaging apparatus according to claim 1,
wherein, in the case where the ranging area which includes the subject where the subject distance is the shortest and the ranging area where the MTF is the highest are not the same and the rate of decrease of the MTF of the ranging area which includes the subject where the subject distance is the shortest with regard to the ranging area where the MTF is the highest is large on the basis of a threshold value, in a case where difference values in the subject distances in relation to the subjects included in each of the ranging areas are large on the basis of a threshold value, the selection section removes the ranging area where the MTF is the highest from the selection target of the focusing target area.

8. The imaging apparatus according to claim 1, further comprising:
a detection section which detects a specific target object which is included in the generated imaging image, wherein
the selection section arranges the ranging areas one the basis of a position of the detected specific target object in the generated imaging image.

9. An imaging system comprising:
an interchangeable lens which is provided with a plurality of optical members which includes a lens, a first communication section which performs communication with the imaging apparatus, and a holding section which holds MTF according to each of the states of the plurality of optical members for each of the states of the plurality of optical members; and
an imaging apparatus which is provided with a second communication section which performs communication with the interchangeable lens, an imaging section which converts incident light from a subject which is incident via the lens and generates an imaging image; a selection section which, in regard to each of a plurality of ranging areas arranged in the generated imaging image, obtains an MTF for each of the ranging areas in relation to the lens from the holding section, calculates a subject distance which is a distance from the lens to a subject included in the ranging area for each of the ranging areas, and selects a ranging area which includes a subject to be a focusing target as a focusing target area based on the calculated subject distance and the obtained MTF, and a focus control section which performs focus control so as to focus on a subject included in the selected focusing target area.

10. A control method of an imaging apparatus comprising: obtaining by circuitry, in regard to each of a plurality of ranging areas arranged in an imaging image generated by an imaging section, a subject distance which is a distance from a lens which supplies incident light from a subject to the imaging section to a subject included in the ranging area and an MTF for each of the ranging areas in relation to the lens, and selecting a ranging area which includes a subject to be a focusing target as a focusing target area based on the obtained subject distance and MTF; and
performing focus control so as to focus on a subject included in the selected focusing target area, wherein
in a case where it is determined whether or not the ranging area which includes the subject where the subject distance is the shortest and the ranging area where the MTF is the highest are the same and the ranging areas are not the same, in a case where the MTF of the ranging area which includes the subject where the subject distance is the shortest is small on the basis of a threshold value, removing the ranging area from the selection target of the focusing target area and performing the determination with regard to each of the ranging areas which are selection targets of the focusing target area after the removal.

11. A non-transitory computer-readable medium storing a program which, when executed on a computer, causes the computer to perform a process comprising: obtaining, in regard to each of a plurality of ranging areas arranged in an imaging image generated by an imaging section, a subject distance which is a distance from a lens which supplies incident light from a subject to the imaging section to a subject included in the ranging area and an MTF for each of the ranging areas in relation to the lens, and selecting a ranging area which includes a subject to be a focusing target as a focusing target area based on the obtained subject distance and MTF; and
performing focus control so as to focus on a subject included in the selected focusing target area, wherein
in a case where it is determined whether or not the ranging area which includes the subject where the subject distance is the shortest and the ranging area where the MTF is the highest are the same and the ranging areas are not the same, in a case where the MTF of the ranging area which includes the subject where the subject distance is the shortest is small on the basis of a threshold value, removing the ranging area from the selection target of the focusing target area and performing the determination with regard to each of the ranging areas which are selection targets of the focusing target area after the removal.

* * * * *